(12) United States Patent
Harase et al.

(10) Patent No.: US 10,884,125 B2
(45) Date of Patent: Jan. 5, 2021

(54) PARKING ASSISTANCE DEVICE

(71) Applicant: Mitsubishi Electric Corporation, Tokyo (JP)

(72) Inventors: Shinichi Harase, Tokyo (JP); Satoru Inoue, Tokyo (JP); Ryotaro Suzuki, Tokyo (JP); Wataru Tsujita, Tokyo (JP); Yoshitsugu Sawa, Tokyo (JP); Tsutomu Asahina, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/348,436

(22) PCT Filed: Jan. 18, 2017

(86) PCT No.: PCT/JP2017/001550
§ 371 (c)(1),
(2) Date: May 8, 2019

(87) PCT Pub. No.: WO2018/134915
PCT Pub. Date: Jul. 26, 2018

(65) Prior Publication Data
US 2020/0057157 A1    Feb. 20, 2020

(51) Int. Cl.
*B60Q 1/00* (2006.01)
*G01S 15/931* (2020.01)
(Continued)

(52) U.S. Cl.
CPC ........... *G01S 15/931* (2013.01); *B60W 30/06* (2013.01); *G01S 13/931* (2013.01); *G01S 2013/9314* (2013.01); *G01S 2015/935* (2013.01)

(58) Field of Classification Search
CPC ................. G01S 15/931; G01S 13/931; G01S 2013/9314; G01S 2015/935; B60W 30/06
(Continued)

(56) References Cited

U.S. PATENT DOCUMENTS 8,912,923 B2 * 12/2014 Barth .................. B62D 15/028
340/932.2
2005/0057374 A1 * 3/2005 Tanaka ................ B62D 15/028
340/932.2
(Continued)

FOREIGN PATENT DOCUMENTS

JP        2006-7875 A      1/2006

*Primary Examiner* — Tanmay K Shah
(74) *Attorney, Agent, or Firm* — Birch, Stewart, Kolasch & Birch, LLP

(57) ABSTRACT

A parking assistance device (100) is provided with distance sensors (2FL, 2FR, 2RL, 2RR) which transmit detection waves laterally with respect to a host vehicle (1) while the host vehicle (1) travels and receive reflected waves of the detection waves, a reflection point calculating unit (11) which calculates a reflection point indicating a position where the detection wave is reflected, a grouping unit (13) which groups the reflection points, a parking space pitch calculating unit (14) which calculates a parking space pitch indicating a width of each parking space by using periodicity of a shape of a reflection point group set by grouping, a parking target area setting unit (15) which sets a parking target area which is a target of perpendicular parking by the host vehicle (1), and a parking assistance controlling unit (21) which guides the host vehicle (1) to the parking target area on the basis of the parking space pitch.

8 Claims, 24 Drawing Sheets

(51) Int. Cl.
 *B60W 30/06* (2006.01)
 *G01S 13/931* (2020.01)
(58) Field of Classification Search
 USPC .......................................................... 340/435
 See application file for complete search history.

(56) References Cited

U.S. PATENT DOCUMENTS

| | | |
|---|---|---|
| 2005/0285758 A1 | 12/2005 | Matsukawa et al. |
| 2009/0278709 A1* | 11/2009 | Endo .................... B62D 15/027 340/932.2 |
| 2012/0062396 A1* | 3/2012 | Inoue .................... G01S 15/931 340/932.2 |
| 2013/0021171 A1* | 1/2013 | Hsu .................... B62D 15/0285 340/932.2 |
| 2015/0254981 A1* | 9/2015 | Tachibana ................. B60R 1/00 340/932.2 |

* cited by examiner

PARKING ASSISTANCE DEVICE

TECHNICAL FIELD

The present disclosure relates to parking assistance devices.

BACKGROUND ART

Technologies of detecting parked vehicles (hereinafter referred to as a "parked vehicle(s)") and/or objects by using one or more distance sensors provided on a vehicle (hereinafter referred to as a "host vehicle") when the host vehicle executes perpendicular parking have been developed. Also, technologies of setting an area (hereinafter referred to as a "parking target area") which is a target of the perpendicular parking by the host vehicle using a result of the detection and guiding the host vehicle to the parking target area have been developed (see, for example, Patent Literature 1).

CITATION LIST

Patent Literatures

Patent Literature 1: JP 2006-7875 A

SUMMARY OF INVENTION

Technical Problem

Normally, a parking lot for perpendicular parking includes a plurality of parking spaces, and one vehicle may be freely parked in each parking space. When a plurality of parking spaces adjacent to each other is included in the parking target area, a parking assistance device for the perpendicular parking is required to guide a host vehicle to a central portion of any one of the parking spaces.

In this case, a parking assistance device of Patent Literature 1 calculates a central position of the parking space arranged on a rightmost side among a plurality of parking spaces included in the parking target area in accordance with Equation (1) below. In Eq. (1), Xpos represents the central position of the parking space arranged on the rightmost side out of a plurality of parking spaces included in the parking target area (planned parking area), Xmin represents a central position of one parked vehicle 20 parked in a parking space to the right of the parking target area (planned parking area), WL represents a size of the parked vehicle 20, dm represents a predetermined margin, and W is a width of the host vehicle (refer to paragraphs [0073] to [0075] and FIGS. 18 and 19 of Patent Literature 1).

$$Xpos = Xmin + (WL + dm + W)/2 \quad (1)$$

Next, the parking assistance device of Patent Literature 1 allows the host vehicle to be parked to the left of the parked vehicle 20 by guiding the host vehicle on the basis of the calculated central position Xpos. The margin dm in Eq. (1) above corresponds to an interval between the host vehicle and the parked vehicle 20 in a state in which parking of the host vehicle is completed (refer to, e.g. paragraph [0065], of Patent Literature 1).

Generally, the width of each parking space is different for each parking lot, and an appropriate interval between the vehicles also differs for each parking lot. Therefore, when a fixed value margin dm is used as in the parking assistance device in Patent Literature 1, the calculated central position Xpos might be displaced from the central position of the actual parking space. As a result, there is a problem in that the parked host vehicle is close to the left side or the right side within the parking space, or in that the parked host vehicle protrudes from the parking space. That is, there is a problem in that reliability of guidance is low when a plurality of parking spaces is included in the parking target area.

One or more embodiments of the present disclosure have been made to solve the above-described problems, and it is an object to improve the reliability of guidance in a situation in which a plurality of parking spaces is included in the parking target area for a parking assistance device for perpendicular parking using a distance sensor.

Solution to Problem

A parking assistance device of the present disclosure is provided with a distance sensor for transmitting a detection wave laterally with respect to a host vehicle and receiving a reflected wave of the detection wave while the host vehicle travels; a reflection point calculating unit for calculating reflection points indicating a position at which the detection wave is reflected; a grouping unit for grouping the reflection points; a parking space pitch calculating unit for calculating a parking space pitch indicating a width of a parking space by using periodicity of a shape included in a reflection point group set in the grouping; a parking target area setting unit for setting a parking target area which is a target of perpendicular parking by the host vehicle; and a parking assistance controlling unit for guiding the host vehicle to the parking target area on a basis of the parking space pitch.

Advantageous Effects of Invention

According to the configuration described above, it is possible to improve reliability of guidance when a plurality of parking spaces is included in the parking target area in the parking assistance device for perpendicular parking using a distance sensor.

DESCRIPTION OF EMBODIMENTS

Hereinafter, to describe the invention in more detail, embodiments of the present disclosure are explained with reference to the attached drawings.

Embodiment 1

Figure 1:
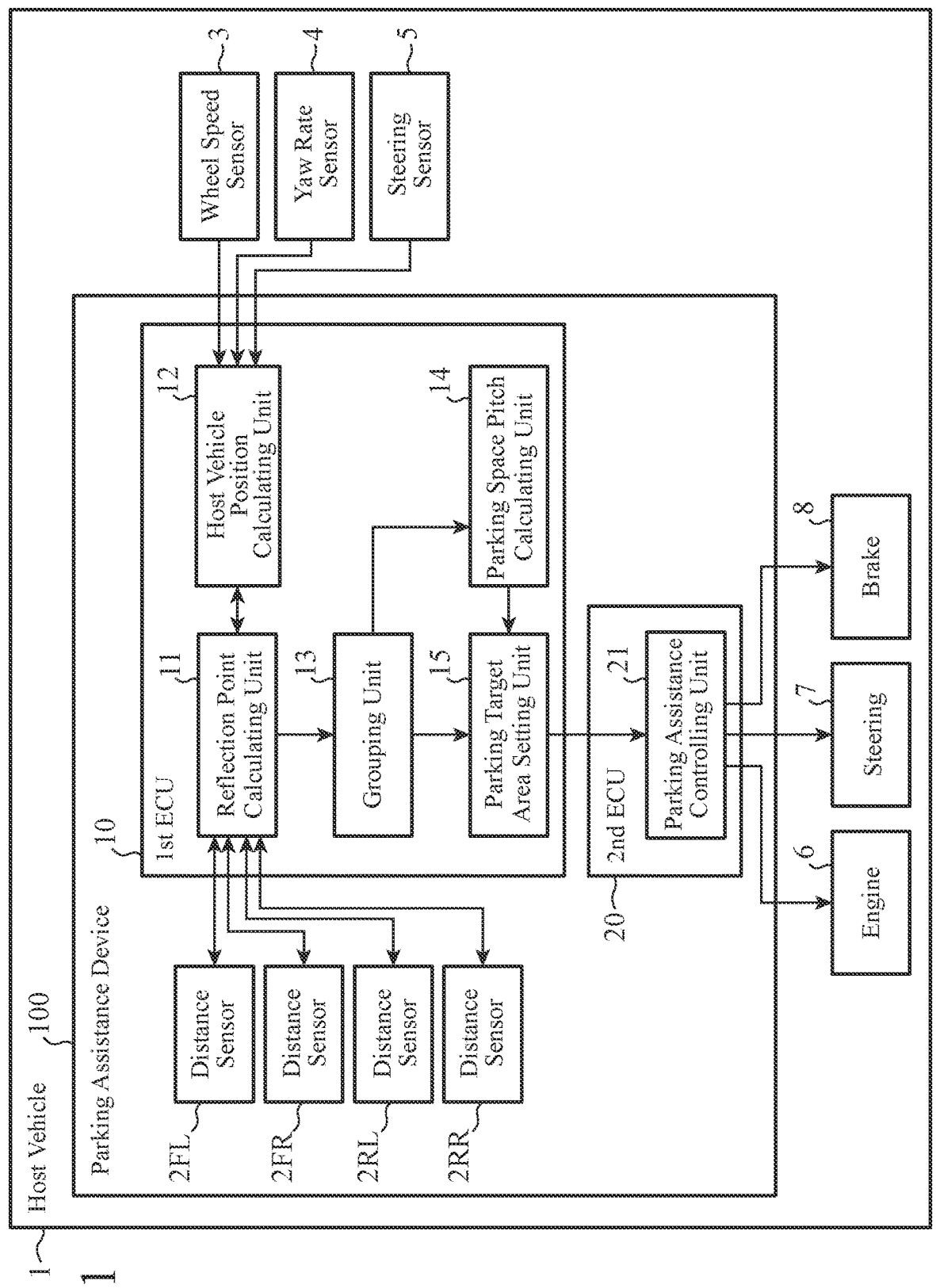
FIG. 1 is a functional block diagram illustrating a state in which a parking assistance device according to Embodiment 1 of the present disclosure is mounted on a host vehicle.
Figure 2:
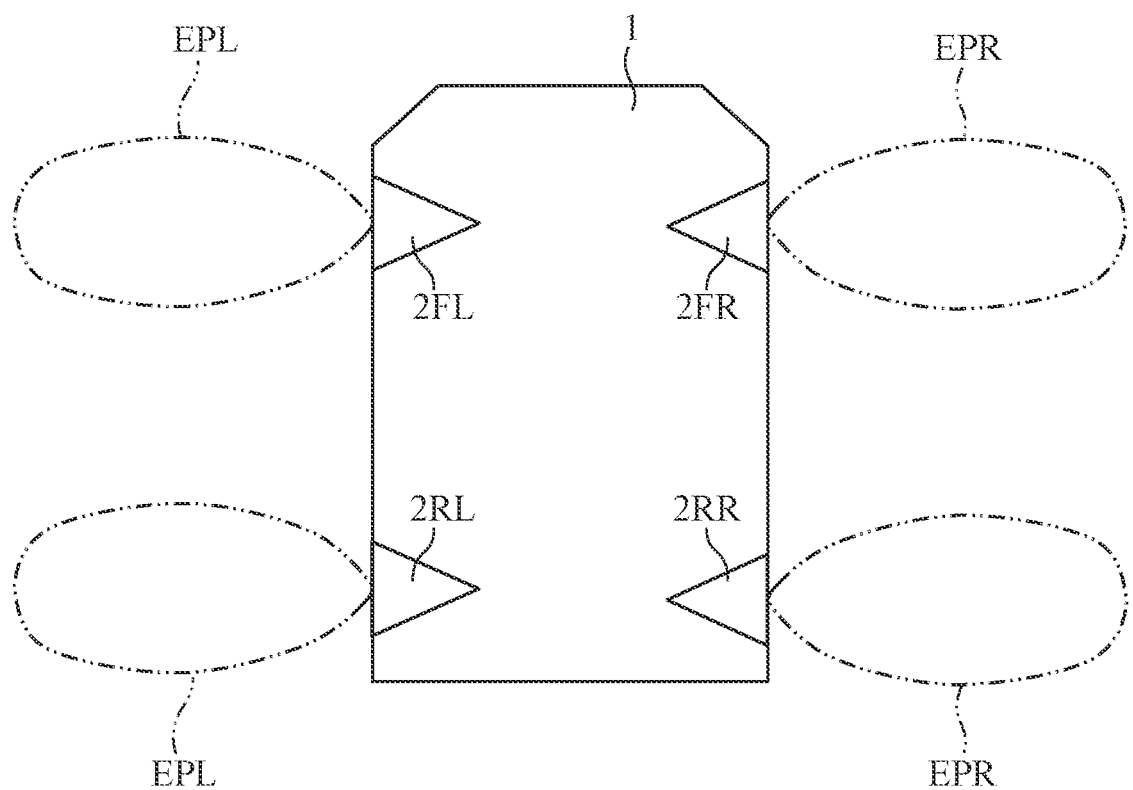
FIG. 2 is an explanatory view illustrating an arrangement of distance sensors in the host vehicle according to Embodiment 1 of the present disclosure.

FIG. 1 is a functional block diagram illustrating a state in which a parking assistance device according to Embodiment 1 of the present disclosure is mounted on a host vehicle. FIG. 2 is an explanatory view illustrating arrangement of distance sensors in the host vehicle according to Embodiment 1 of the present disclosure. With reference to FIGS. 1 and 2, a parking assistance device 100 according to Embodiment 1 is described.

As illustrated in FIG. 1, a plurality of distance sensors 2FL, 2FR, 2RL, and 2RR is provided on a host vehicle 1. More specifically, as illustrated in FIG. 2, a pair of right and left distance sensors 2FR and 2FL are provided in a front half portion of the host vehicle 1 and a pair of right and left distance sensors 2RR and 2RL are provided in a rear half portion of the host vehicle 1. Each of the distance sensors 2FL, 2FR, 2RL, and 2RR transmits a detection wave such as an ultrasonic wave, a radio wave in a millimeter wave band, or a laser light beam, and receives a reflected wave of the detection wave.

Hereinafter, an example in which ultrasonic sensors are used as the distance sensors 2FL, 2FR, 2RL, and 2RR is mainly described in Embodiment 1. That is, the distance sensors 2FL and 2RL arranged on a left side portion of the host vehicle 1 transmit the ultrasonic waves to the left of the host vehicle 1 and the distance sensors 2FR and 2RR arranged on a right side portion of the host vehicle 1 transmit the ultrasonic waves to the right of the host vehicle 1. FIG. 2 illustrates a radiation pattern EPL of the ultrasonic wave to the left of the host vehicle 1 and a radiation pattern EPR of the ultrasonic wave to the right of the host vehicle 1.

Also, the host vehicle 1 is provided with a wheel speed sensor 3, a yaw rate sensor 4, and a steering sensor 5. The wheel speed sensor 3 detects a rotational speed of a wheel of the host vehicle 1 and outputs a pulse signal corresponding to the rotational speed (hereinafter referred to as a "vehicle speed signal"). The yaw rate sensor 4 detects a yaw rate of the host vehicle 1 and outputs a signal indicating the yaw rate (hereinafter referred to as a "yaw rate signal"). The steering sensor 5 detects a steering angle of the host vehicle 1 and outputs a signal indicating the steering angle (hereinafter referred to as a "rudder angle signal").

When the host vehicle 1 travels at a speed equal to or lower than a predetermined speed (hereinafter referred to as a "low speed"; for example, a speed of 10 km/hour or lower) to carry out perpendicular parking, a reflection point calculating unit 11 allows the distance sensors 2FL, 2FR, 2RL, and 2RR to transmit the ultrasonic waves. When the distance sensors 2FL, 2FR, 2RL, and 2RR receive the reflected waves, the reflection point calculating unit 11 calculates a distance value corresponding to a propagation time of the ultrasonic wave.

Also, when the host vehicle 1 travels at a low speed to carry out perpendicular parking, the reflection point calculating unit 11 instructs a host vehicle position calculating unit 12 to calculate a position of the host vehicle 1 at each time point during the travel (hereinafter referred to as a "host vehicle position"). The reflection point calculating unit 11 obtains the host vehicle position calculated by the host vehicle position calculating unit 12. The reflection point calculating unit 11 calculates a coordinate point (hereinafter referred to as a "reflection point") indicating a position where the ultrasonic wave is reflected by a so-called "two-circle intersection process" by using the calculated distance value and the host vehicle position obtained from the host vehicle position calculating unit 12.

For example, it is assumed that one distance sensor 2FL transmits and receives the ultrasonic wave twice while the host vehicle 1 travels. The reflection point calculating unit 11 calculates a position of the distance sensor 2FL when the distance sensor 2FL transmits and receives each ultrasonic wave by using the host vehicle position calculated by the host vehicle position calculating unit 12. The reflection point calculating unit 11 calculates a circular arc the center of which is the position of the distance sensor 2FL when transmitting and receiving a first ultrasonic wave and a radius of which is the distance value corresponding to the propagation time of the first ultrasonic wave. The reflection point calculating unit 11 calculates a circular arc the center of which is the position of the distance sensor 2FL when transmitting and receiving a second ultrasonic wave and a radius of which is the distance value corresponding to the propagation time of the second ultrasonic wave. The reflection point calculating unit 11 calculates an intersection of these circular arcs as one reflection point.

The host vehicle position calculating unit 12 calculates the host vehicle position using the vehicle speed signal, the yaw rate signal, the rudder angle signal and the like in response to the instruction from the reflection point calculating unit 11.

A grouping unit 13 groups the reflection points calculated by the reflection point calculating unit 11. Specifically, for example, when a distance between adjacent reflection points is a value smaller than a predetermined threshold (hereinafter referred to as a "grouping threshold"), the grouping unit 13 includes these reflection points in the same group. On the other hand, when the distance between the adjacent reflection points is a value equal to or larger than the grouping threshold, the grouping unit 13 includes these reflection points in different groups.

When the ultrasonic waves transmitted by the distance sensors 2FL, 2FR, 2RL, and 2RR are reflected by one or more parked vehicles, one or more groups are normally set by the grouping unit 13, and each group includes a plurality of reflection points. Hereinafter, each group set by the grouping unit 13 is referred to as a "reflection point group".

A parking space pitch calculating unit 14 calculates a width of each parking space (hereinafter, referred to as a "parking space pitch") in a parking lot in which the host vehicle 1 is to be parked (hereinafter, this is sometimes simply referred to as a "parking lot") by using periodicity of a shape of the reflection point group set by the grouping unit 13. A process by the parking space pitch calculating unit 14 is to be described later in detail with reference to a flowchart in FIG. 6.

A parking target area setting unit 15 detects an area in which the perpendicular parking of the host vehicle 1 may be performed (hereinafter, referred to as a "parkable area") by using the reflection point group set by the grouping unit 13 and the parking space pitch calculated by the parking space pitch calculating unit 14. Also, the parking target area setting unit 15 sets an area which becomes a target of the perpendicular parking by the host vehicle 1 out of the parkable area, that is, a parking target area. Furthermore, the parking target area setting unit 15 instructs a parking assistance controlling unit 21 to guide the host vehicle 1 to the parking target area. A process by the parking target area setting unit 15 is described later in detail with reference to a flowchart in FIG. 7.

The parking assistance controlling unit 21 guides the host vehicle 1 to the parking target area in response to the instruction from the parking target area setting unit 15. More specifically, the parking assistance controlling unit 21 executes automatic parking in the parking target area by controlling torque of an engine 6, a steering 7, and a brake 8.

Note that, when executing the automatic parking, the parking assistance controlling unit 21 uses the vehicle speed signal, the yaw rate signal, the rudder angle signal and the like. In FIG. 1, a connection line between the wheel speed sensor 3 and the parking assistance controlling unit 21, a connection line between the yaw rate sensor 4 and the parking assistance controlling unit 21, and a connection line between the steering sensor 5 and the parking assistance controlling unit 21 are not illustrated.

The reflection point calculating unit 11, the host vehicle position calculating unit 12, the grouping unit 13, the parking space pitch calculating unit 14, and the parking target area setting unit 15 are provided, for example, on an electronic control unit (hereinafter referred to as a "first ECU") 10 mounted on the host vehicle 1. The parking assistance controlling unit 21 is provided, for example, on another electronic control unit (hereinafter referred to as a "second ECU") 20 mounted on the host vehicle 1. The distance sensors 2FL, 2FR, 2RL, and 2RR, the reflection point calculating unit 11, the host vehicle position calculating unit 12, the grouping unit 13, the parking space pitch calculating unit 14, the parking target area setting unit 15, and the parking assistance controlling unit 21 form a substantial part of the parking assistance device 100.

Figure 3A:
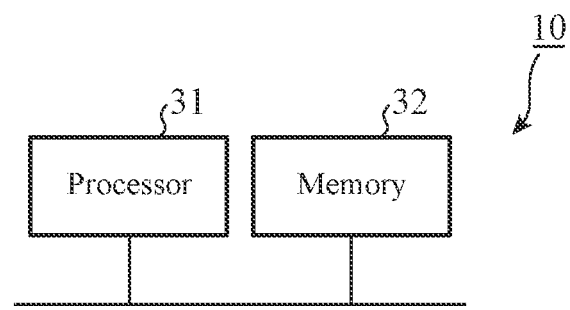
FIG. 3A is a hardware configuration diagram illustrating a substantial part of a first ECU according to Embodiment 1 of the present disclosure.

Next, with reference to FIG. 3, a hardware configuration of a substantial part of the first ECU 10 is described. As illustrated in FIG. 3A, the first ECU 10 is formed of a computer and includes a processor 31 and a memory 32. The memory 32 stores a program for allowing the computer to serve as the reflection point calculating unit 11, the host vehicle position calculating unit 12, the grouping unit 13, the parking space pitch calculating unit 14, and the parking target area setting unit 15 illustrated in FIG. 1. When the processor 31 reads out and executes the program stored in the memory 32, functions of the reflection point calculating unit 11, the host vehicle position calculating unit 12, the grouping unit 13, the parking space pitch calculating unit 14, and the parking target area setting unit 15 illustrated in FIG. 1 are implemented.

The processor 31 includes, for example, a central processing unit (CPU), a digital signal processor (DSP), a microcontroller, or a microprocessor. The memory 32 includes, for example, a semiconductor memory such as a random access memory (RAM), a read only memory (ROM), a flash memory, an erasable programmable read only memory (EPROM) or an electrically erasable programmable read only memory (EEPROM), or a magnetic disk such as a hard disk drive (HDD).

Figure 3B:
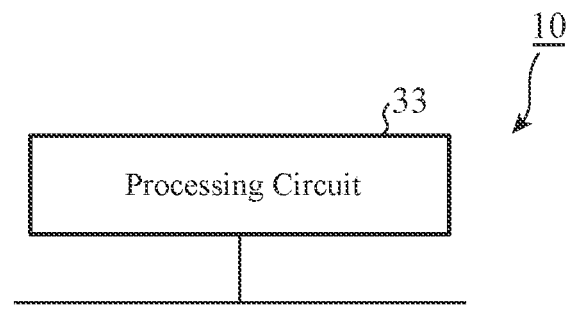
FIG. 3B is another hardware configuration diagram illustrating the substantial part of the first ECU according to Embodiment 1 of the present disclosure.

Alternatively, as illustrated in FIG. 3B, the first ECU 10 is implemented as a dedicated processing circuit 33. The processing circuit 33 is, for example, an application specific integrated circuit (ASIC), a field-programmable gate array (FPGA), a system large-scale integration (LSI), or a combination thereof.

Note that, each of the functions of the reflection point calculating unit 11, the host vehicle position calculating unit 12, the grouping unit 13, the parking space pitch calculating unit 14, and the parking target area setting unit 15 illustrated in FIG. 1 may be implemented by the processing circuit 33, or the functions of the respective units may be collectively implemented by the processing circuit 33. It is also possible to implement some functions of the reflection point calculating unit 11, the host vehicle position calculating unit 12, the grouping unit 13, the parking space pitch calculating unit 14, and the parking target area setting unit 15 illustrated in FIG. 1 by the processor 31 and the memory 32 illustrated in FIG. 3A and implement remaining functions by the processing circuit 33 illustrated in FIG. 3B.

Figure 4A:
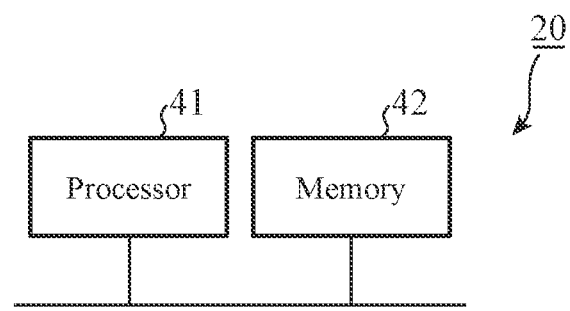
FIG. 4A is a hardware configuration diagram illustrating a substantial part of a second ECU according to Embodiment 1 of the present disclosure.

Next, with reference to FIG. 4, a hardware configuration of a substantial part of the second ECU 20 is described. As illustrated in FIG. 4A, the second ECU 20 is implemented as a computer and includes a processor 41 and a memory 42. The memory 42 stores a program for allowing the computer to serve as the parking assistance controlling unit 21 illustrated in FIG. 1. When the processor 41 reads out the program stored in the memory 42 to execute, the function of the parking assistance controlling unit 21 illustrated in FIG. 1 is implemented.

The processor 41 includes, for example, a CPU, a DSP, a microcontroller, or a microprocessor. The memory 42 includes, for example, a semiconductor memory such as a RAM, a ROM, a flash memory, an EPROM, or an EEPROM, or a magnetic disk such as a HDD.

Figure 4B:
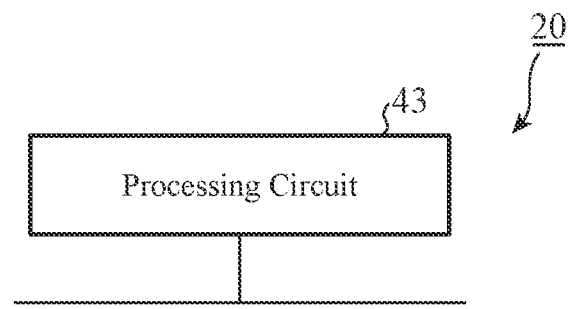
FIG. 4B is another hardware configuration diagram illustrating the substantial part of the second ECU according to Embodiment 1 of the present disclosure.

Alternatively, as illustrated in FIG. 4B, the second ECU 20 is implemented as a dedicated processing circuit 43. The processing circuit 43 is, for example, an ASIC, a FPGA, a system LSI, or a combination thereof.

Figure 5:
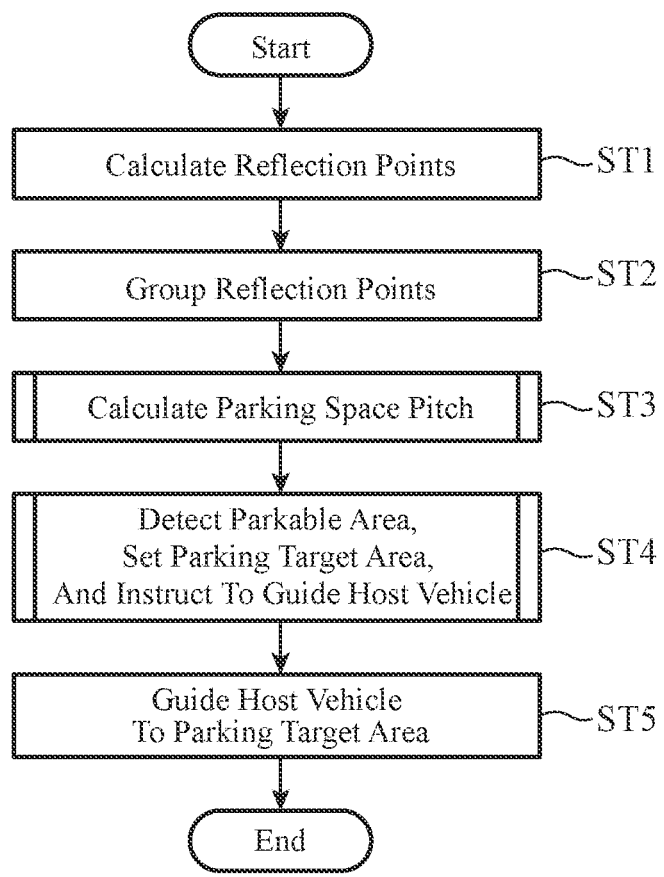
FIG. 5 is a flowchart illustrating an operation of a parking assistance device according to Embodiment 1 of the present disclosure.

Next, the operation of the parking assistance device 100 is described with reference to a flowchart in FIG. 5.

When the host vehicle 1 travels at a low speed to carry out perpendicular parking, the reflection point calculating unit 11 allows the distance sensors 2FL, 2FR, 2RL, and 2RR to transmit the ultrasonic waves. When the distance sensors 2FL, 2FR, 2RL, and 2RR receive the reflected waves, the reflection point calculating unit 11 calculates the distance value corresponding to the propagation time of the ultrasonic wave. Also, the reflection point calculating unit 11 instructs the host vehicle position calculating unit 12 to calculate the host vehicle position and obtains the host vehicle position calculated by the host vehicle position calculating unit 12. When the host vehicle 1 stops, or when a travel distance of the host vehicle 1 at a low speed exceeds a predetermined distance (for example, five meters), the parking assistance device 100 starts a process at step ST1.

First, at step ST1, the reflection point calculating unit 11 calculates a reflection point in accordance with the two-circle intersection process by using the distance value calculated while the host vehicle 1 travels at a low speed and the host vehicle positions obtained from the host vehicle position calculating unit 12.

Next, at step ST2, the grouping unit 13 groups the reflection points calculated by the reflection point calculating unit 11 at step ST1. Specifically, for example, when the distance between the adjacent reflection points is a value smaller than the grouping threshold, the grouping unit 13 includes the reflection points in the same reflection point group. On the other hand, when the distance between the adjacent reflection points is equal to or larger than the grouping threshold, the grouping unit 13 includes the reflection points in different reflection point groups.

Next, at step ST3, the parking space pitch calculating unit 14 calculates the parking space pitch using the periodicity of the shape of the reflection point group set at step ST2. The process at step ST3 is described later in detail with reference to the flowchart in FIG. 6.

Next, at step ST4, the parking target area setting unit 15 detects the parkable area, sets the parking target area, and instructs the parking assistance controlling unit 21 to guide the host vehicle 1 to the parking target area. The process at step ST4 is described later in detail with reference to the flowchart in FIG. 7.

Next, at step ST5, the parking assistance controlling unit 21 guides the host vehicle 1 to the parking target area in response to the instruction from the parking target area setting unit 15 at step ST4. More specifically, the parking assistance controlling unit 21 executes the automatic parking in the parking target area by controlling the torque of the engine 6, the steering 7, and the brake 8.

Figure 6:
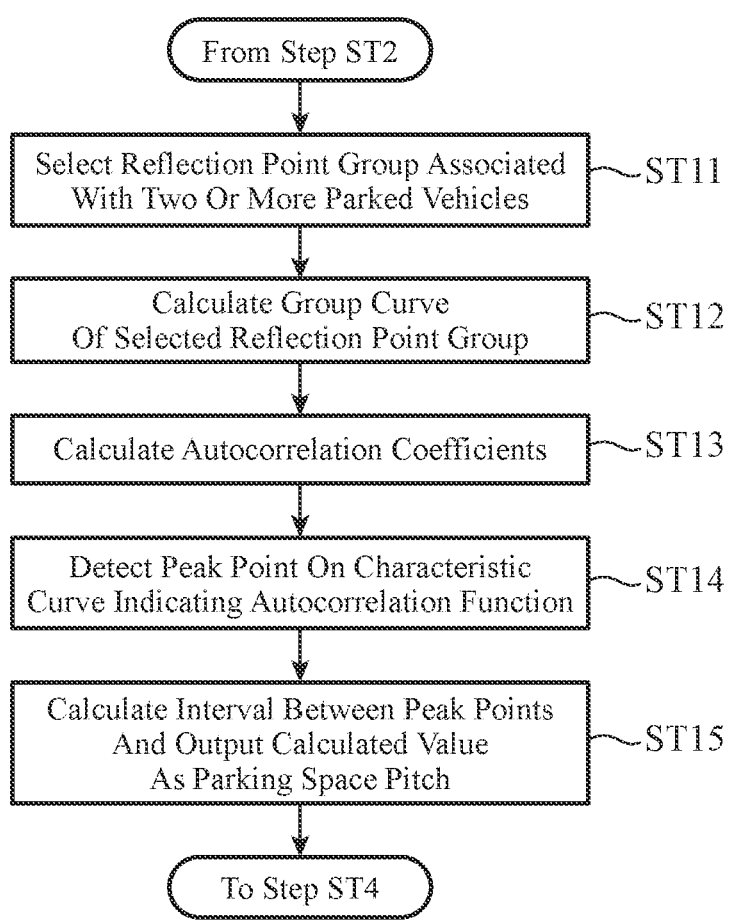
FIG. 6 is a flowchart illustrating a detailed operation of a parking space pitch calculating unit according to Embodiment 1 of the present disclosure.

Next, with reference to the flowchart in FIG. 6, a process at step ST3 by the parking space pitch calculating unit 14 is described in detail.

First, at step ST11, the parking space pitch calculating unit 14 selects at least one reflection point group associated with two or more parked vehicles out of the reflection point groups set by the grouping unit 13 at step ST2.

Specifically, for example, the parking space pitch calculating unit 14 compares a width of each reflection point group (hereinafter referred to as a "group width") set by the grouping unit 13 with a predetermined threshold. This threshold is set to a value (for example, three meters) corresponding to a total value of a width of two common automobiles and a width of an interval between the parked vehicles in a common parking lot. When the group width of each reflection point group is a value equal to or larger than the threshold, the parking space pitch calculating unit 14 determines that the reflection point group is associated with two or more parked vehicles.

Alternatively, for example, the parking space pitch calculating unit 14 compares the group width of each reflection point group set by the grouping unit 13 with another threshold. This threshold is set to a value (for example, a value of 1.5 meters or larger and 2.5 meters or smaller) corresponding to a width of one common automobile. When the group width of each reflection point group is a value larger than the threshold, the parking space pitch calculating unit 14 determines that the reflection point group is associated with two or more parked vehicles.

Next, at step ST12, the parking space pitch calculating unit 14 calculates a curve (hereinafter referred to as a "group curve") connecting the reflection points included in the reflection point group selected at step ST11.

Next, at step ST13, the parking space pitch calculating unit 14 shifts the group curve calculated at step ST12 by a predetermined distance (hereinafter referred to as a "shift amount") in a predetermined direction (hereinafter referred to as a "shift direction") to obtain shifted curves, and calculates coefficients (hereinafter referred to as an "autocorrelation coefficient") each indicating a degree of correlation between each shifted curve and the group curve.

At that time, the parking space pitch calculating unit 14 sets a direction along a travel direction of the host vehicle 1 at a low speed as the shift direction. Alternatively, the parking space pitch calculating unit 14 calculates an approximate straight line of the reflection point group selected at step ST11 and sets a direction along the calculated approximate straight line as the shift direction. In order to calculate the approximate straight line, a method such as a so-called "least-square method" or "random sample consensus (RANSAC)" is used. Also, the parking space pitch calculating unit 14 sets a largest value of the shift amount to a value larger than a value (for example, a value of 1.5 meters or larger and 2.5 meters or smaller) corresponding to the width of one common automobile.

Hereinafter, a function indicating the autocorrelation coefficients with respect to shift amount is referred to as an "autocorrelation function". Herein, since the shift direction and the largest value of the shift amount are set as described above, a characteristic curve indicating the autocorrelation function (hereinafter referred to as a "first characteristic curve") has a shape having periodicity. Also, the first characteristic curve has a plurality of peak points, and an interval between the peak points is a value corresponding to the parking space pitch.

Accordingly, the parking space pitch calculating unit 14 detects the peak points on the first characteristic curve (step ST14). The parking space pitch calculating unit 14 calculates the interval between the peak points and outputs the calculated value as the parking space pitch (step ST15).

Figure 7:
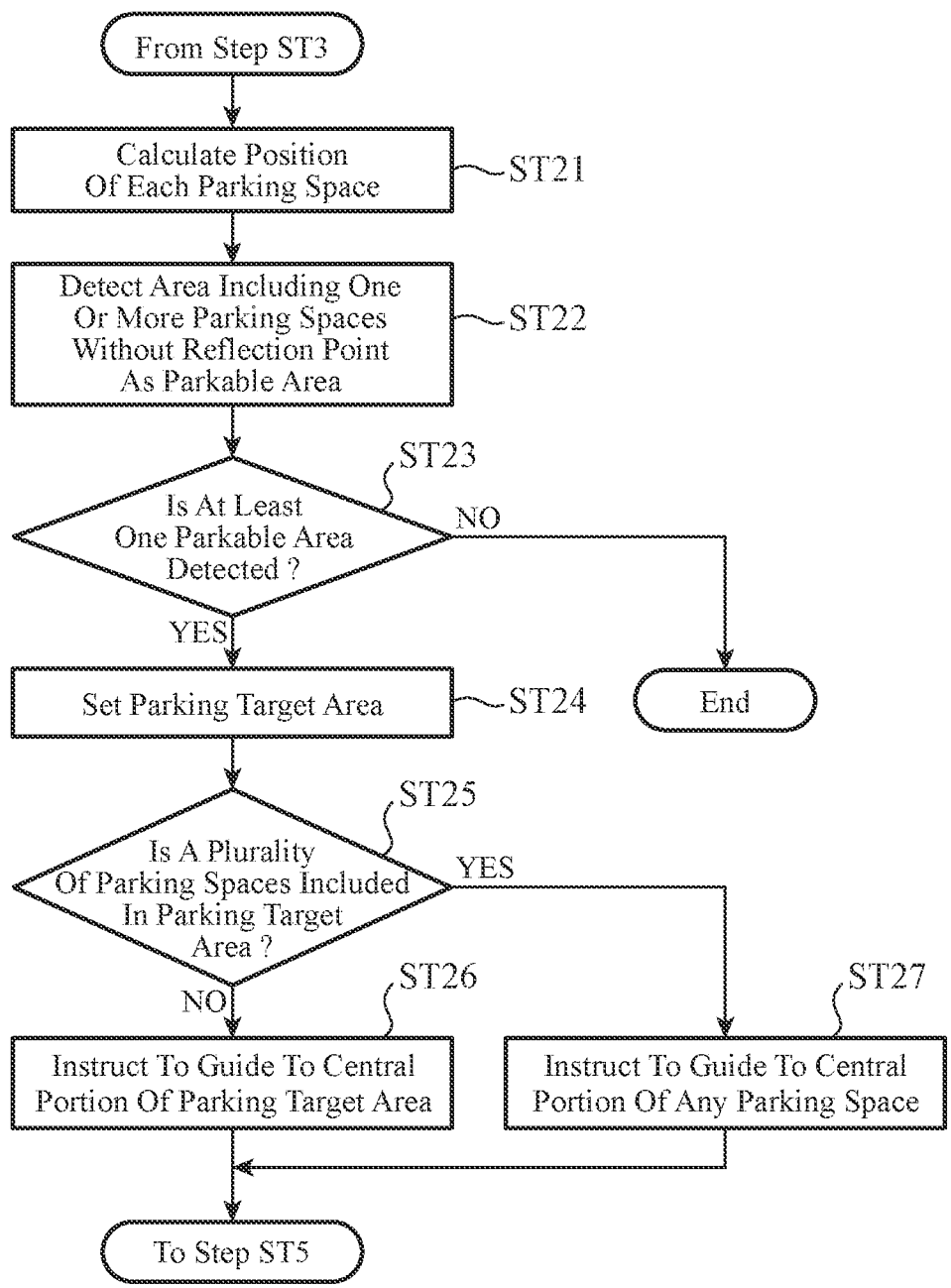
FIG. 7 is a flowchart illustrating detailed operation of a parking assistance controlling unit according to Embodiment 1 of the present disclosure.

Next, the process at step ST4 by the parking target area setting unit 15 is described in detail with reference to the flowchart in FIG. 7.

First, at step ST21, the parking target area setting unit 15 calculates a position of each parking space. That is, the parking target area setting unit 15 obtains the reflection point group set by the grouping unit 13 at step ST2 and the parking space pitch calculated by the parking space pitch calculating unit 14 at step ST3. The parking target area setting unit 15 calculates position coordinates of corners of each parking space depending on the parking space pitch and the position indicated by each reflection point included in each reflection point group.

Subsequently, at step ST22, the parking target area setting unit 15 executes a process of detecting an area including one or more parking spaces without the reflection point as the parkable area.

When at least one parkable area is detected by the process at step ST22 (step ST23 "YES"), the parking target area setting unit 15 sets the parking target area at step ST24.

That is, when one parkable area is detected at step ST22, the parking target area setting unit 15 sets the one parkable area as the parking target area. On the other hand, when a plurality of parkable areas is detected at step ST22, the parking target area setting unit 15 sets any one of the plurality of parkable areas as the parking target area. Specifically, for example, the parking target area setting unit 15 sets the parkable area closest to a current position of the host vehicle 1 out of the plurality of parkable areas as the parking target area. Alternatively, for example, the parking target area setting unit 15 sets the parkable area selected by operation input to an operation input device not illustrated out of the plurality of parkable areas as the parking target area.

Next, at step ST25, the parking target area setting unit 15 determines whether a plurality of parking spaces is included in the parking target area set at step ST24.

When there is one parking space included in the parking target area (step ST25 "NO"), at step ST26, the parking target area setting unit 15 instructs the parking assistance controlling unit 21 to guide the host vehicle 1 to a central portion of the parking target area.

On the other hand, when a plurality of parking spaces is included in the parking target area (step ST25 "YES"), at step ST27, the parking target area setting unit 15 instructs the parking assistance controlling unit 21 to guide the host vehicle 1 to the central portion of any one parking space out of the plurality of parking spaces included in the parking target area. Specifically, for example, the parking target area setting unit 15 instructs the parking assistance controlling unit 21 to guide the host vehicle 1 to the central portion of the parking space closest to the current position of the host vehicle 1 out of the plurality of parking spaces.

That is, in response to the instruction at step ST26 or ST27, at step ST5, the parking assistance controlling unit 21 guides the host vehicle 1 to the central portion of the parking target area when one parking space is included in the parking target area, and guides the host vehicle 1 to the central portion of any one parking space out of the plurality of parking spaces when the plurality of parking spaces is included in the parking target area.

Note that, when no parkable area is detected at step ST22 ("NO" at step ST23), the parking target area setting unit 15 finishes the process without instructing the parking assistance controlling unit 21 to guide the host vehicle 1. In this case, the process at step ST5 by the parking assistance controlling unit 21 is skipped and the parking assistance device 100 finishes the process.

Next, a specific example of the process by the parking assistance device 100 is described with reference to FIGS. 8 to 11.

Figure 8:
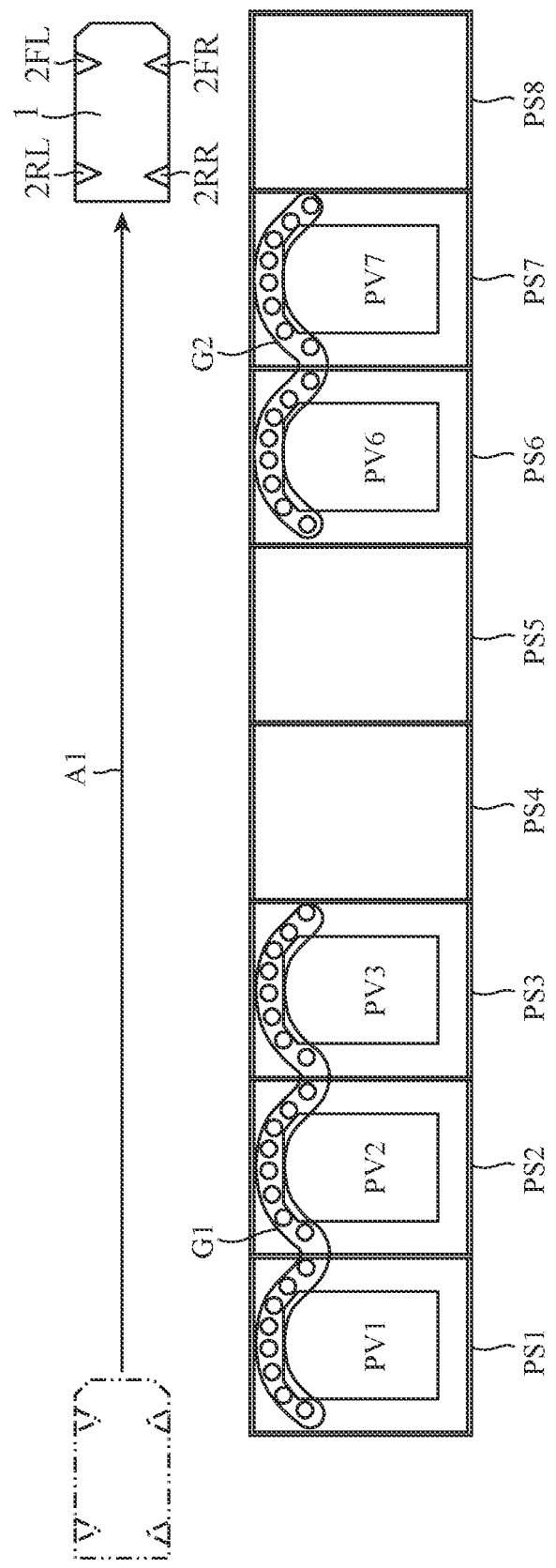
FIG. 8 is an explanatory view illustrating a reflection point calculated by a reflection point calculating unit and a reflection point group set by a grouping unit, according to Embodiment 1 of the present disclosure.

As illustrated in FIG. 8, eight parking spaces PS1 to PS8 are arranged side by side in the parking lot for perpendicular parking. The host vehicle 1 travels at a low speed in an arrangement direction of the parking spaces PS1 to PS8. In the drawing, an arrow A1 indicates a travel trajectory of the host vehicle 1 at a low speed. The ultrasonic waves transmitted by the distance sensors 2FR and 2RR during the travel are reflected by parked vehicles PV1 to PV3, PV6, and PV7. As a result, the reflection point calculating unit 11 calculates a plurality of reflection points indicated by white circles (o) in the drawing (step ST1). The grouping unit 13 sets two reflection point groups G1 and G2 by grouping these reflection points (step ST2).

Figure 9A:
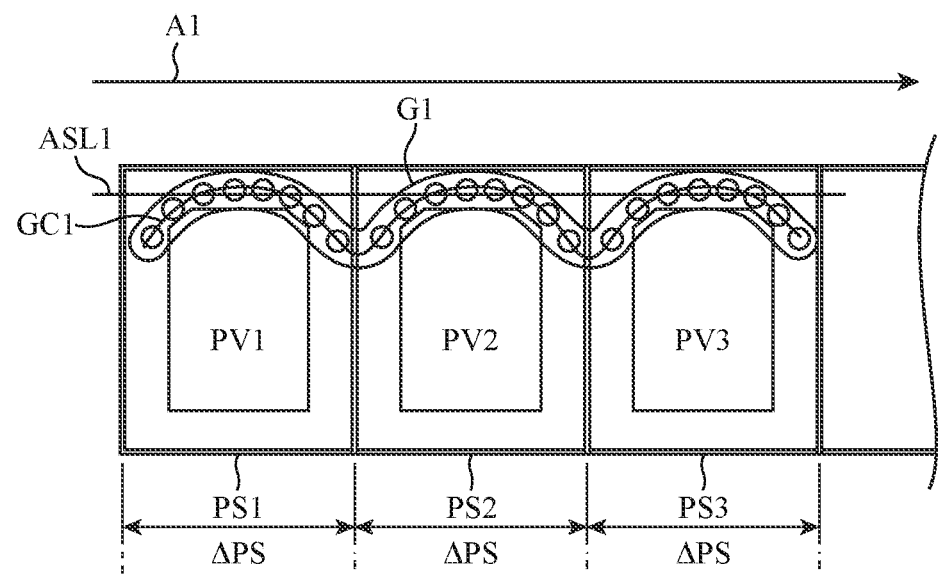
FIG. 9A is an explanatory view illustrating a group curve and the like calculated by the parking space pitch calculating unit according to Embodiment 1 of the present disclosure.

Next, the parking space pitch calculating unit 14 selects one reflection point group G1 associated with the three parked vehicles PV1 to PV3 (step ST11). As illustrated in FIG. 9A, the parking space pitch calculating unit 14 calculates a group curve GC1 of the selected reflection point group G1 (step ST12). The parking space pitch calculating unit 14 calculates autocorrelation coefficients for the group curve GC1 (step ST13).

At that time, the parking space pitch calculating unit 14 sets the direction along the travel direction of the host vehicle 1 at a low speed, that is to say, a direction in the arrow A1 as the shift direction. Alternatively, the parking space pitch calculating unit 14 calculates an approximate straight line ASL1 of the reflection point group G1 and sets a direction along the approximate straight line ASL1 as the shift direction. Note that, in an example illustrated in FIG. 9, the host vehicle 1 travels in the arrangement direction of the parking spaces PS1 to PS8, and the arrow A1 and the approximate straight line ASL1 are substantially parallel to each other.

Also, the parking space pitch calculating unit 14 sets the largest value of the shift amount to a value larger than a total of widths of three common automobiles. It is possible to increase the number of peak points on the characteristic curve indicating the autocorrelation function, that is to say, the first characteristic curve by increasing the largest value of the shift amount within a range corresponding to the number of parked vehicles corresponding to the reflection point group selected at step ST11.

Figure 9B:
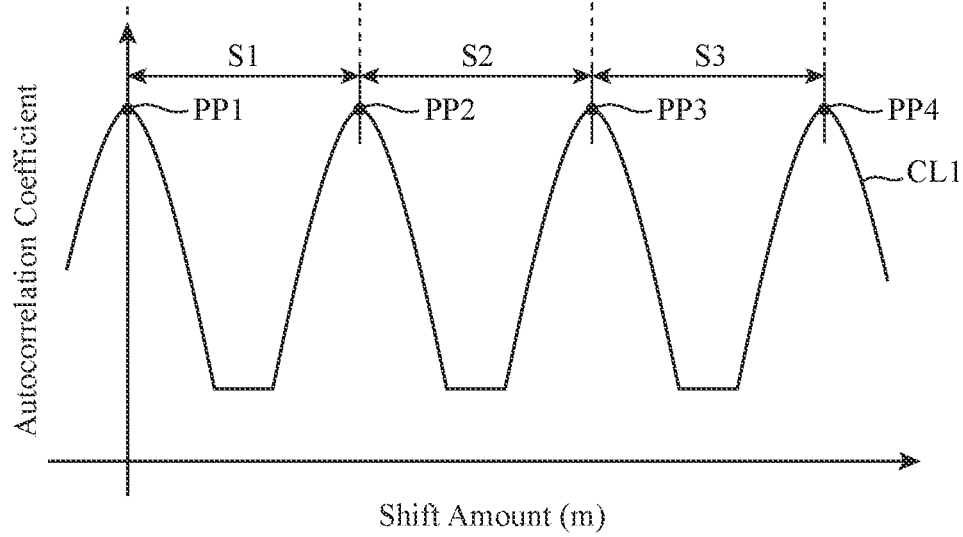
FIG. 9B is a characteristic diagram illustrating an autocorrelation function.

As illustrated in FIG. 9B, the first characteristic curve CL1 has a shape having periodicity and includes a plurality of peak points PP1 to PP4. An interval S1 between the peak points PP1 and PP2, an interval S2 between the peak points PP2 and PP3, and an interval S3 between the peak points PP3 and PP4 are values related to a parking space pitch ΔPS.

Accordingly, the parking space pitch calculating unit 14 detects the peak points PP1 to PP4 on the first characteristic curve CL1 (step ST14). The parking space pitch calculating unit 14 calculates the interval S1 between the peak points PP1 and PP2, the interval S2 between the peak points PP2 and PP3, or the interval S3 between the peak points PP3 and PP4, and outputs the calculated value as the parking space pitch ΔPS (step ST15).

Note that, the parking space pitch calculating unit 14 may calculate a plurality of intervals S1 to S3 and output an average value of the intervals S1 to S3 as the parking space pitch ΔPS. In the example illustrated in FIG. 9, since the parked vehicles PV1 to PV3 are arranged in the central portion of the corresponding parking space PS1 to PS3, respectively, the intervals S1 to S3 are values substantially equal to each other. However, when each of the parked vehicles PV1 to PV3 is located on the left or right within each of the corresponding parking spaces PS1 to PS3, the intervals S1 to S3 are different from each other. It is possible to reduce an effect of variation in arrangement of the parked vehicles PV1 to PV3 in the parking spaces PS1 to PS3, respectively, on calculation of the parking space pitch ΔPS by calculating the average value of the intervals S1 to S3.

Figure 10:
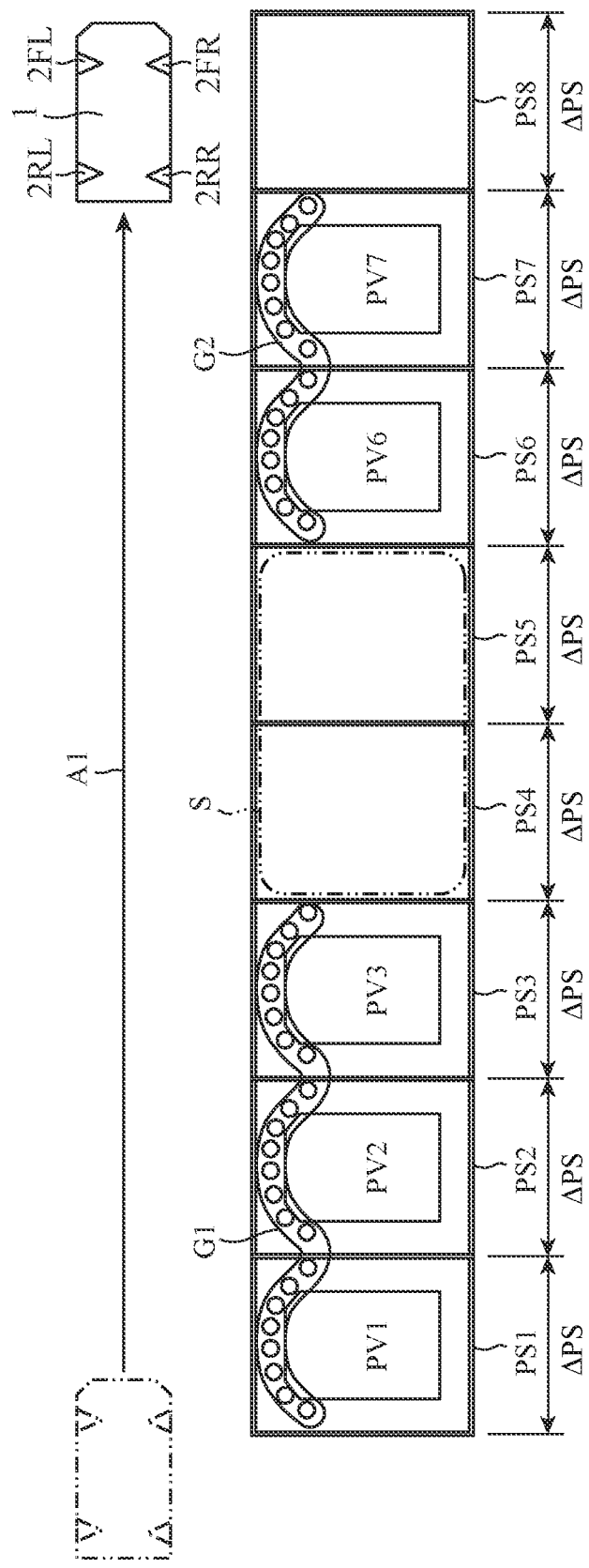
FIG. 10 is an explanatory view illustrating a parking target area and the like set by a parking target area setting unit according to Embodiment 1 of the present disclosure.

Next, as illustrated in FIG. 10, the parking target area setting unit 15 calculates the positions of the parking spaces PS1 to PS8 on the basis of the parking space pitch ΔPS and the position indicated by each reflection point included in each of the reflection point groups G1 and G2 (step ST21).

Subsequently, the parking target area setting unit 15 detects one area S including two parking spaces PS4 and PS5 having no reflection point as the parkable area (step ST22) and sets the area S as the parking target area (step ST24). Since two parking spaces PS4 and PS5 are included in the parking target area S (step ST25 "YES"), the parking target area setting unit 15 instructs the parking assistance controlling unit 21 to guide the host vehicle 1 to the central portion of any one of the parking spaces PS4 and PS5 (step ST27). Specifically, for example, the parking target area setting unit 15 instructs the parking assistance controlling unit 21 to guide the host vehicle 1 to the central portion of the parking space PS5 closer to the current position of the host vehicle 1 out of the parking spaces PS4 and PS5.

Figure 11:
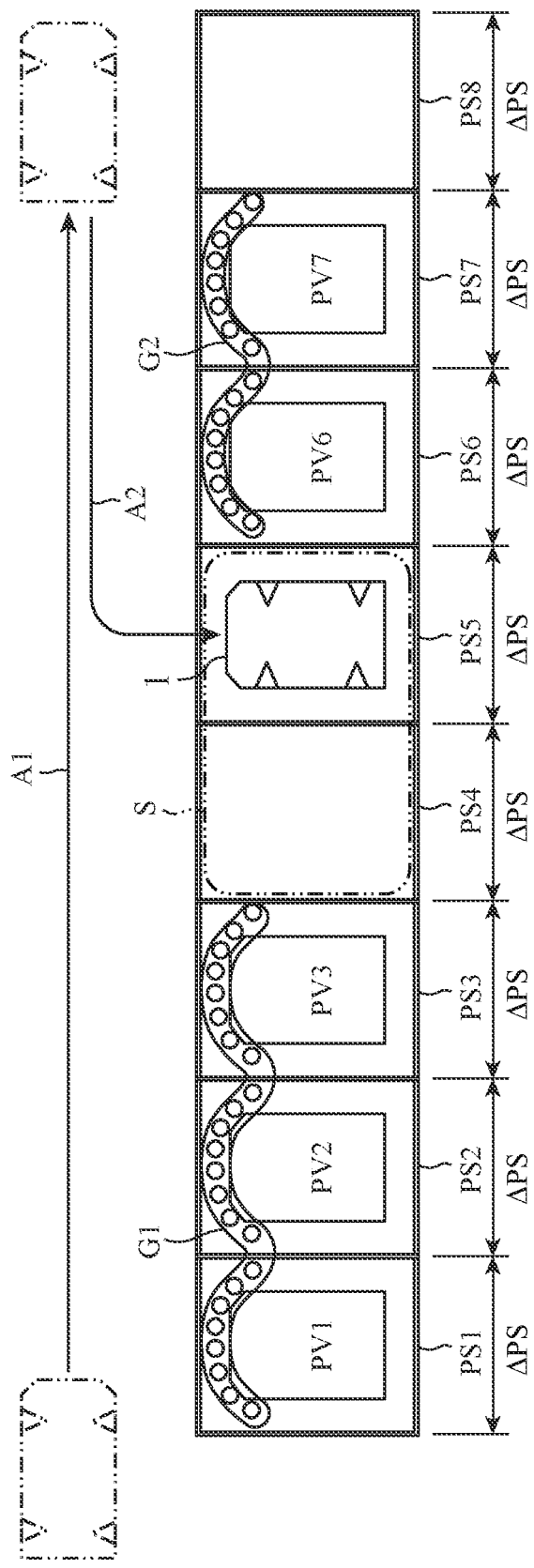
FIG. 11 is an explanatory view illustrating a guiding route of the host vehicle and the like by the parking assistance controlling unit according to Embodiment 1 of the present disclosure.

Then, as illustrated in FIG. 11, the parking assistance controlling unit 21 guides the host vehicle 1 to the central portion of the parking space PS5 (step ST5). In the drawing, an arrow A2 indicates a travel trajectory of the host vehicle 1 by the guidance of the parking assistance controlling unit 21.

In this manner, the parking assistance device 100 according to Embodiment 1 calculates the parking space pitch by using the periodicity of the shape of the reflection point group and guides the host vehicle 1 on the basis of the parking space pitch. As a result, the host vehicle 1 may be guided to an appropriate parking position. As a result, it is possible to prevent a state in which the parked host vehicle 1 is located on the left side or the right side within the parking space, or a state in which the parked host vehicle 1 protrudes from the parking space.

Especially, the parking space pitch includes an interval between the parked vehicles, that is, an appropriate interval between the vehicles in the parking lot where the host vehicle 1 is to be parked. Therefore, as compared with a configuration using a fixed value margin as in the parking assistance device of Patent Literature 1, reliability of guidance when a plurality of parking spaces is included in the parking target area may be improved.

Note that, it is also possible that a distance range (hereinafter referred to as a "detectable range") in which an object may be detected by the distance sensors 2FL, 2FR, 2RL, and 2RR is stored in advance in the reflection point calculating unit 11, and the reflection point calculating unit 11 excludes the reflection point indicating the position out of the detectable range from a grouping target by outputting only the reflection point indicating the position within the detectable range out of the reflection points calculated by the two-circle intersection process to the grouping unit 13. As a result, the reflection point due to a noise component such as road surface echo may be excluded from the grouping target.

Figure 12:
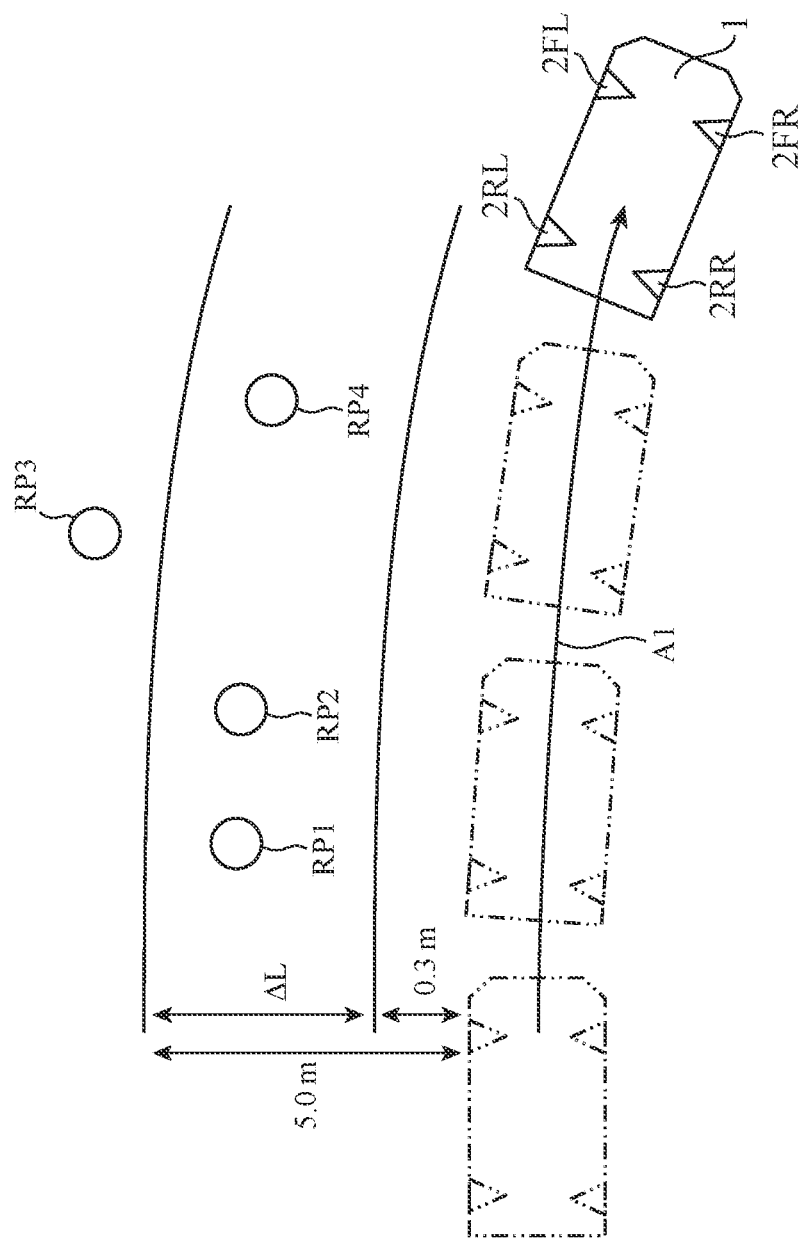
FIG. 12 is an explanatory view illustrating a detectable range and the like by the distance sensor according to Embodiment 1 of the present disclosure.

For example, as illustrated in FIG. 12, it is supposed that the distance range of 0.3 to 5.0 meters is set as a detectable range ΔL, the reflection point calculating unit 11 calculates four reflection points RP1 to RP4 by the two-circle intersection process while the host vehicle 1 travels along the arrow A1, and one reflection point RP3 out of them indicates the position out of the detectable range ΔL. In this case, the reflection point calculating unit 11 excludes the reflection point RP3 from the grouping target by outputting only the three reflection points RP1, RP2, and RP4 indicating positions within the detectable range ΔL to the grouping unit 13.

Also, after selecting the reflection point group at step ST11, the parking space pitch calculating unit 14 may correct the selected reflection point group depending on a moving state of the host vehicle 1 and execute processes at steps ST12 to ST15 regarding the corrected reflection point group.

Figure 13:
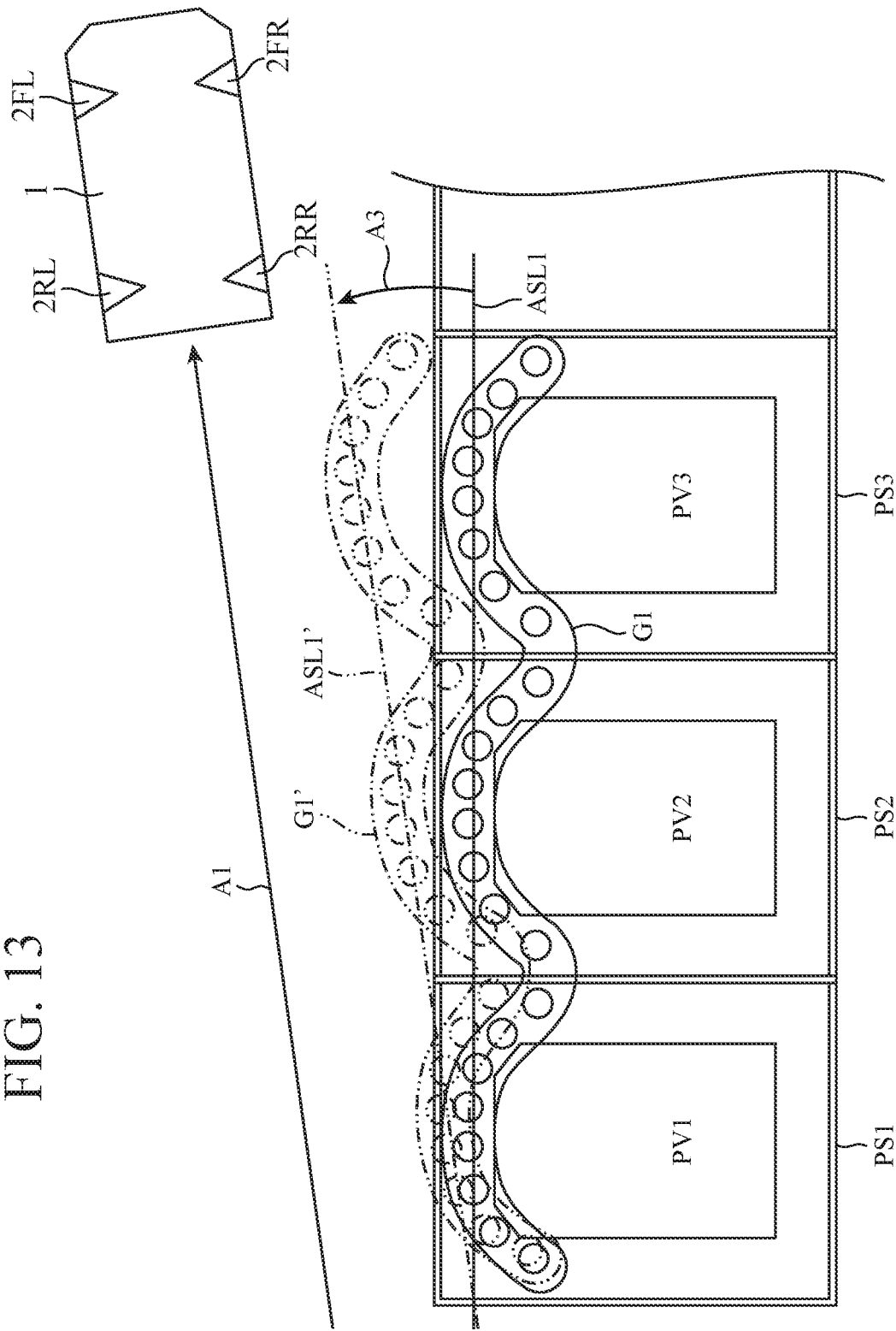
FIG. 13 is an explanatory view illustrating correction of the reflection point group by the parking space pitch calculating unit according to Embodiment 1 of the present disclosure.

For example, as illustrated in FIG. 13, it is supposed that the host vehicle 1 travels in a direction oblique to the arrangement direction of the parking spaces PS1 to PS3, that is, in a direction gradually away from the parked vehicles PV1 to PV3. In such moving state, the travel direction of the host vehicle 1 (that is, the direction along the arrow A1) and the direction along the approximate straight line ASL1 of the reflection point group G1 are not parallel to each other. For this, the parking space pitch calculating unit 14 corrects the reflection point group G1 to a reflection point group G1' such that the approximate straight line ASL1 not parallel to the arrow A1 becomes an approximate straight line ASL1' parallel to the arrow A1. Specifically, for example, the parking space pitch calculating unit 14 rotates the reflection point group G1 as indicated by an arrow A3 in the drawing. As a result, it is possible to calculate the autocorrelation function by setting the direction along the arrow A1 as the shift direction.

Figure 14:
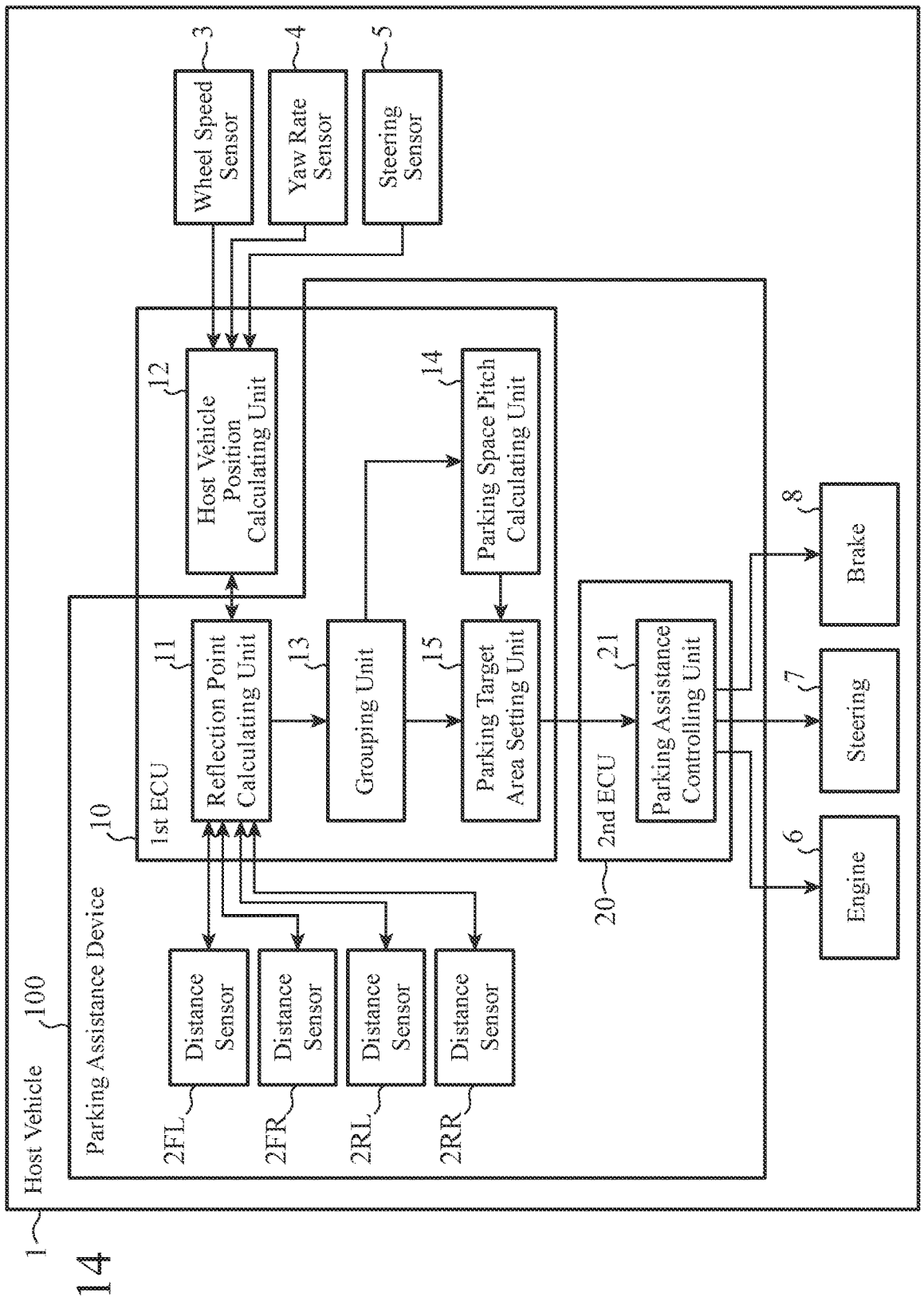
FIG. 14 is a functional block diagram illustrating a state in which another parking assistance device according to Embodiment 1 of the present disclosure is mounted on the host vehicle.

Also, as illustrated in FIG. 14, it is also possible that the parking assistance device 100 does not include the host vehicle position calculating unit 12. In this case, the host vehicle position calculating unit 12 may be provided outside the first ECU 10 and the second ECU 20 (for example, provided on another electronic control unit not illustrated or a navigation device not illustrated).

Also, the parking assistance device 100 may include either the distance sensors 2FL and 2FR arranged in the front half portion of the host vehicle 1, or 2RL and 2RR arranged in the rear half portion of the host vehicle 1.

Also, it is only required that the parking space pitch calculating unit 14 calculates the parking space pitch using the periodicity of the shape of the reflection point group, and the method of calculating the parking space pitch is not limited to the method at steps ST11 to ST15 illustrated in FIG. 6. In Embodiment 3 to be described later, a parking assistance device which calculates a parking space pitch by another method is described.

As described above, the parking assistance device 100 according to Embodiment 1 is provided with the distance sensors 2FL, 2FR, 2RL, and 2RR which transmit the detection waves to the side of the host vehicle 1 while the host vehicle 1 travels and receive the reflected waves of the detection waves, the reflection point calculating unit 11 which calculates the reflection point indicating the position where the detection wave is reflected, the grouping unit 13 which groups the reflection points, the parking space pitch calculating unit 14 which calculates the parking space pitch indicating the width of each parking space by using the periodicity of the shape of the reflection point group set by grouping, the parking target area setting unit 15 which sets the parking target area which is the target of the perpendicular parking by the host vehicle 1, and the parking assistance controlling unit 21 which guides the host vehicle 1 to the parking target area on the basis of the parking space pitch. It is possible to guide the host vehicle 1 to an appropriate parking position by calculating the parking space pitch using the periodicity of the shape of the reflection point group and guiding the host vehicle 1 on the basis of the parking space pitch. As a result, it is possible to prevent a state in which the parked host vehicle 1 is located on the left side or the right side within the parking space, or a state in which the parked host vehicle 1 protrudes from the parking space. Especially, as compared with the configuration using the fixed value margin as in the parking assistance device of Patent Literature 1, the reliability of the guidance when a plurality of parking spaces is included in the parking target area may be improved.

Also, the parking space pitch calculating unit 14 calculates the autocorrelation function of the curve (group curve) connecting the reflection points included in the reflection point group, and calculates the parking space pitch on the basis of the interval between the peak points on the characteristic curve indicating the autocorrelation function. As a result, the parking space pitch ΔPS may be calculated as illustrated in FIG. 9.

Also, the parking assistance controlling unit 21 guides the host vehicle 1 to the central portion of the parking target area when one parking space is included in the parking target area, and guides the host vehicle to the central portion of any parking space when a plurality of parking spaces is included in the parking target area. As a result, the host vehicle 1 may be guided to an appropriate parking position. Specifically, for example, when two parking spaces adjacent to each other are included in the parking target area, it is possible to prevent a state in which the parked host vehicle 1 straddles the two parking spaces.

Also, when the distance between the adjacent reflection points is smaller than the threshold, the grouping unit 13 includes the reflection points in the same reflection point group. As a result, as illustrated in FIG. 8, it is possible to set the reflection point group corresponding to the object reflecting the detection waves such as the parked vehicles PV1 to PV3, PV6, and PV7.

Also, the reflection point calculating unit 11 calculates the reflection point by the two-circle intersection process, and excludes the reflection point indicating the position outside the detectable range by the distance sensors 2FL, 2FR, 2RL, and 2RR from the grouping target. As a result, the reflection point due to a noise component such as road surface echo may be excluded from the grouping target.

Also, the parking space pitch calculating unit 14 corrects the reflection point group on the basis of the moving state of the host vehicle 1 and calculates the parking space pitch using the periodicity of the shape of the corrected reflection point group. As a result, it becomes possible to calculate the parking space pitch on the basis of the moving state of the host vehicle 1.

Also, a pair of right and left distance sensors 2FR and 2FL are provided in the front half portion of the host vehicle 1 or a pair of right and left distance sensors 2RR and 2RL are provided in the rear half portion of the host vehicle 1. As a result, it becomes possible to detect the parkable area present to the left of the host vehicle 1 and to detect the parkable area present to the right of the host vehicle 1.

Embodiment 2

Figure 15:
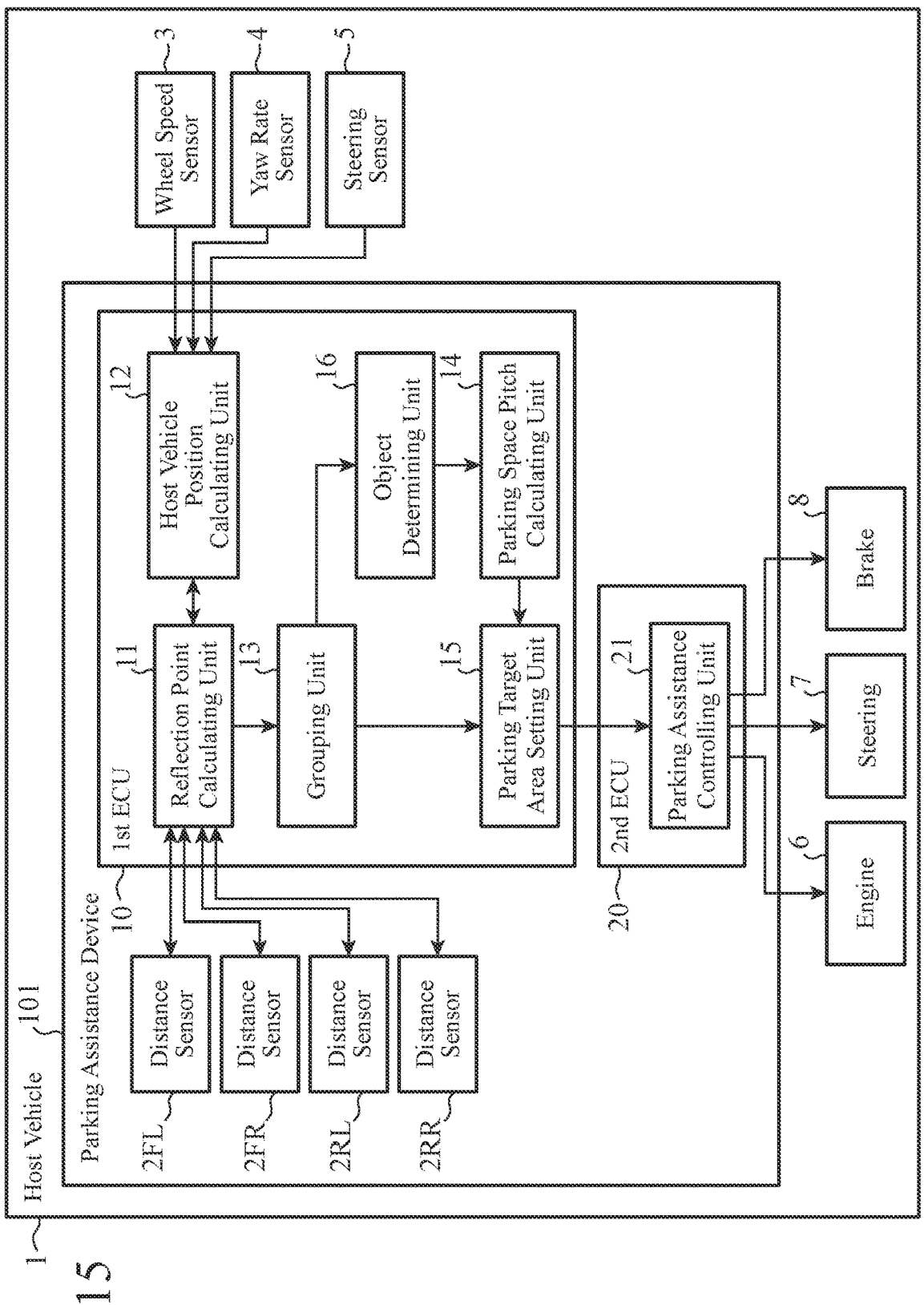
FIG. 15 is a functional block diagram illustrating a state in which a parking assistance device according to Embodiment 2 of the present disclosure is mounted on a host vehicle.

FIG. 15 is a functional block diagram illustrating a state in which a parking assistance device according to Embodiment 2 of the present disclosure is mounted on a host vehicle. With reference to FIG. 15, a parking assistance device 101 according to Embodiment 2 is described.

Note that, in FIG. 15, the same reference sign is assigned to a block similar to that in the functional block diagram of Embodiment 1 illustrated in FIG. 1, and the description thereof is omitted. Also, since arrangement of distance sensors 2FL, 2FR, 2RL, and 2RR in a host vehicle 1 is similar to that described in Embodiment 1 with reference to FIG. 2, illustration and description thereof are omitted. Since a hardware configuration of a first ECU 10 is similar to that described with reference to FIG. 3 in Embodiment 1, illustration and description thereof are omitted. Since a hardware configuration of a second ECU 20 is similar to that described with reference to FIG. 4 in Embodiment 1, illustration and description thereof are omitted.

As illustrated in FIG. 15, an object determining unit 16 is provided on the first ECU 10. The object determining unit 16 determines whether an object associated with each reflection point group set by a grouping unit 13 is a parked vehicle or a wall. A process by the object determining unit 16 is to be described later in detail with reference to a flowchart in FIG. 17. A parking space pitch calculating unit 14 calculates a parking space pitch by using periodicity of a shape of the reflection point group determined to correspond to the parked vehicle by the object determining unit 16 out of the reflection point groups set by the grouping unit 13.

The distance sensors 2FL, 2FR, 2RL, and 2RR, a reflection point calculating unit 11, a host vehicle position calculating unit 12, the grouping unit 13, a parking space pitch calculating unit 14, a parking target area setting unit 15, the object determining unit 16, and a parking assistance controlling unit 21 form a substantial part of the parking assistance device 101.

Figure 16:
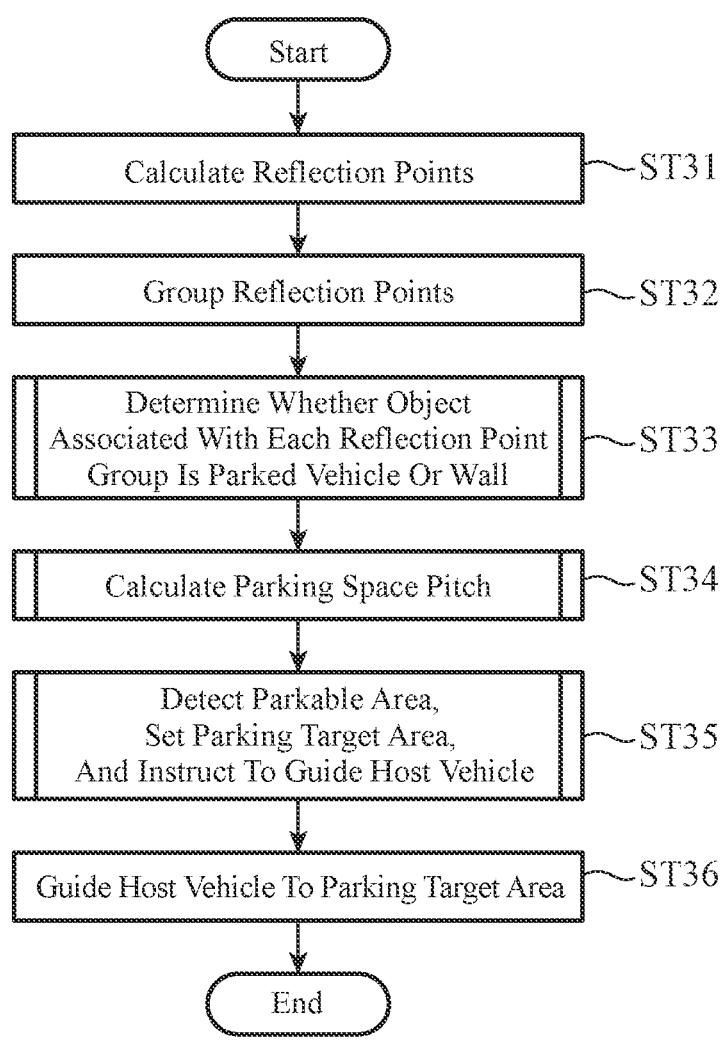
FIG. 16 is a flowchart illustrating operation of the parking assistance device according to Embodiment 2 of the present disclosure.

Next, the operation of the parking assistance device 101 is described with reference to a flowchart in FIG. 16.

First, the reflection point calculating unit 11 calculates the reflection points (step ST31), and then the grouping unit 13 groups the reflection points (step ST32). Content of processes at steps ST31 and ST32 are similar to those at steps ST1 and ST2 illustrated in FIG. 5, so that the description thereof is omitted.

Next, at step ST33, the object determining unit 16 determines whether the object associated with each reflection point group set by the grouping unit 13 at step ST32 is the parked vehicle or the wall. The process at step ST33 is described later in detail with reference to the flowchart in FIG. 17.

Next, the parking space pitch calculating unit 14 calculates the parking space pitch (step ST34). A content of the process at step ST34 is similar to that at step ST3 illustrated in FIG. 5, that is, steps ST11 to ST15 illustrated in FIG. 6, so that the description thereof is omitted. However, at step ST11, the parking space pitch calculating unit 14 selects the reflection point group corresponding to two or more parked vehicles out of the reflection point groups determined to correspond to the parked vehicle at step ST33.

Next, the parking target area setting unit 15 detects a parkable area, sets a parking target area, and instructs the parking assistance controlling unit 21 to guide the host vehicle 1 (step ST35). Content of a process at step ST35 is similar to that at step ST4 illustrated in FIG. 5, that is, steps ST21 to ST27 illustrated in FIG. 7, so that the description thereof is omitted.

Next, the parking assistance controlling unit 21 guides the host vehicle 1 (step ST36). Content of a process at step ST36 is similar to that at step ST5 illustrated in FIG. 5, so that the description thereof is omitted.

Figure 17:
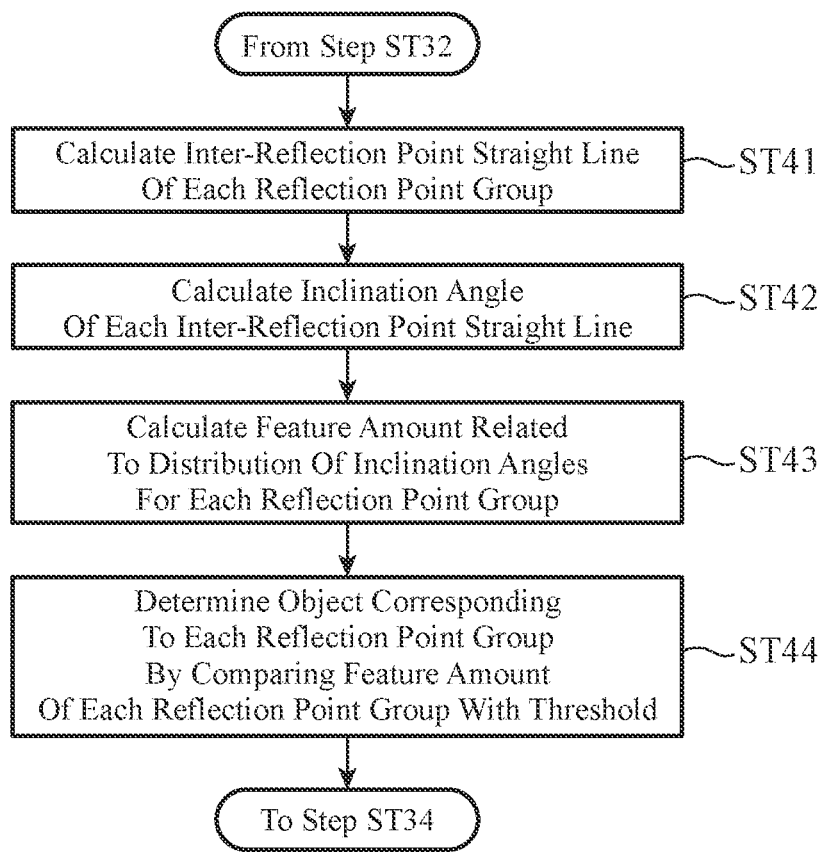
FIG. 17 is a flowchart illustrating detailed operation of an object determining unit according to Embodiment 2 of the present disclosure.

Next, the process at step ST33 by the object determining unit 16 is described in detail with reference to the flowchart in FIG. 17.

First, at step ST41, the object determining unit 16 calculates a straight line that connects adjacent reflection points in each reflection point group set at step ST32 by the grouping unit 13 (hereinafter, referred to as "inter-reflection point straight line"). Normally, each reflection point group includes a plurality of reflection points. Therefore, the object determining unit 16 calculates a plurality of inter-reflection point straight lines for each reflection point group.

Next, at step ST42, the object determining unit 16 calculates an inclination angle of each inter-reflection point straight line with respect to a reference direction. At that time, the object determining unit 16 sets a direction along a travel direction of the host vehicle 1 at a low speed as the reference direction. Alternatively, the object determining unit 16 calculates an approximate straight line of each reflection point group and sets a direction along the calculated approximate straight line as the reference direction.

Next, at step ST43, the object determining unit 16 calculates a feature amount related to distribution of the inclination angles in the reflection point group for each of the reflection point groups. Specifically, for example, the object determining unit 16 obtains frequency distribution of the inclination angles for each reflection point group and calculates a relative ratio between a largest frequency and a second largest frequency in the frequency distribution.

Next, at step ST44, the object determining unit 16 determines whether the object associated with each reflection point group is the parked vehicle or the wall by comparing the feature amount of each reflection point group calculated at step ST43 with a predetermined threshold. Generally, since the shape of the reflection point group associated with a parked vehicle has unevenness, the distribution of the inclination angles spreads. On the other hand, since the shape of the reflection point group associated with a wall is mostly linear, the distribution of the inclination angles becomes narrow. Therefore, it is possible to determine whether the object associated with the reflection point group is the parked vehicle or the wall by comparing the feature amount corresponding to the distribution of the inclination angles with the threshold.

Figure 18:
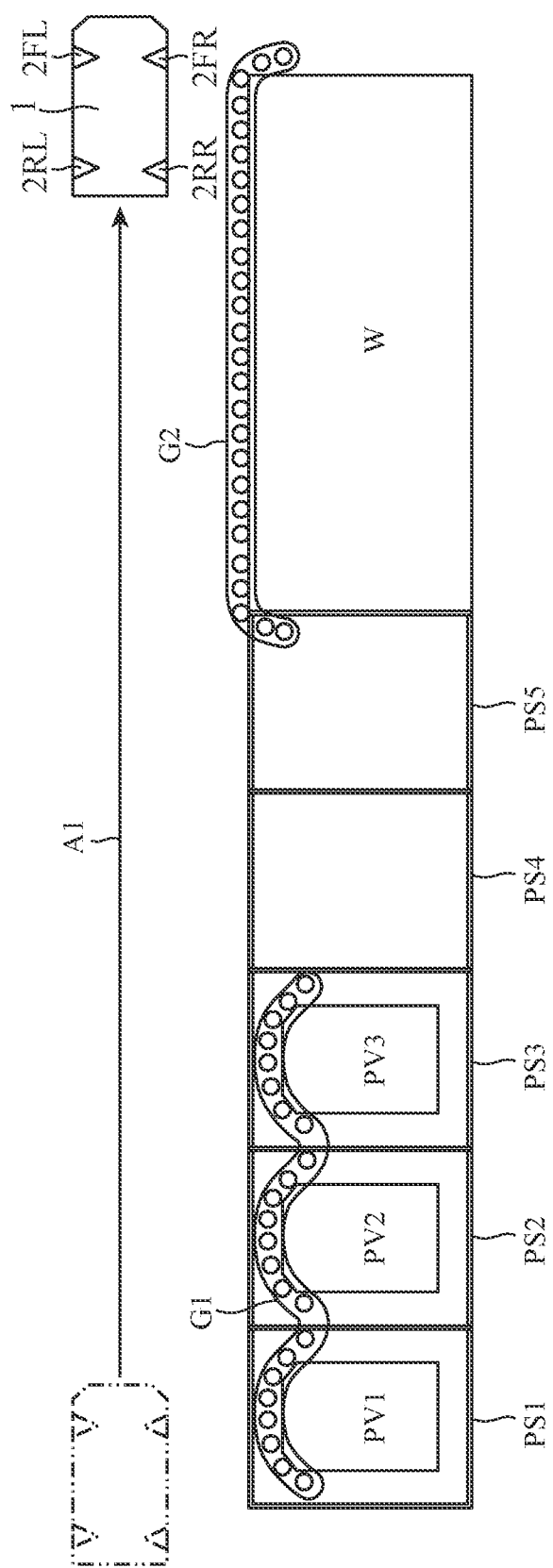
FIG. 18 is an explanatory view illustrating a reflection point calculated by a reflection point calculating unit and a reflection point group set by a grouping unit, according to Embodiment 2 of the present disclosure.

Next, with reference to FIGS. 18 and 19, a specific example of processes by the reflection point calculating unit 11, the grouping unit 13, and the object determining unit 16 is described.

As illustrated in FIG. 18, five parking spaces PS1 to PS5 are arranged side by side in a parking lot for perpendicular parking. A wall W is arranged adjacent to the parking space PS5. The host vehicle 1 travels at a low speed along an arrangement direction of the parking spaces PS1 to PS5. In the drawing, an arrow A1 indicates a travel trajectory of the host vehicle 1 at a low speed. Ultrasonic waves transmitted by the distance sensors 2FR and 2RR during the travel are reflected by parked vehicles PV1 to PV3, and the wall W. As a result, the reflection point calculating unit 11 calculates a plurality of reflection points indicated by white circles (○) in the drawing (step ST31). The grouping unit 13 sets two reflection point groups G1 and G2 by grouping these reflection points (step ST32).

Figure 19A:
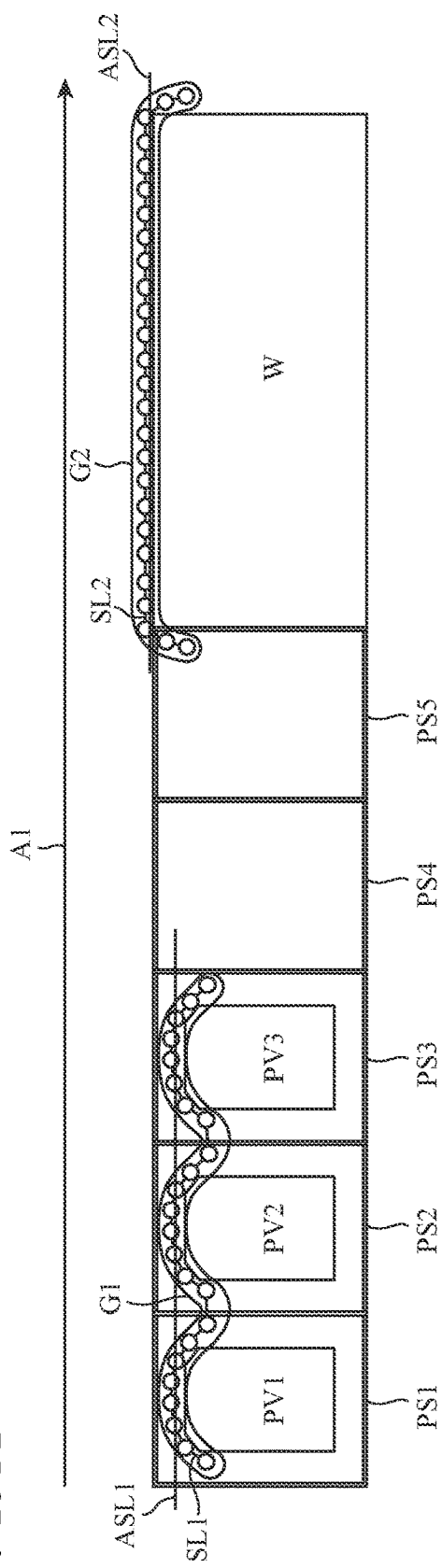
FIG. 19A is an explanatory view illustrating an inter-reflection point straight line and the like calculated by the object determining unit according to Embodiment 2 of the present disclosure.

Next, as illustrated in FIG. 19A, the object determining unit 16 calculates an inter-reflection point straight line SL1 of the reflection point group G1 and an inter-reflection point straight line SL2 of the reflection point group G2 (step ST41). In an example illustrated in FIG. 19, 24 reflection points are included in the reflection point group G1, and 26 reflection points are included in the reflection point group G2. Therefore, the object determining unit 16 calculates 23 inter-reflection point straight lines SL1 and 25 inter-reflection point straight lines SL2.

Next, the object determining unit 16 calculates an inclination angle of each inter-reflection point straight line SL1 with respect to the reference direction and an inclination angle of each inter-reflection point straight line SL2 with respect to the reference direction (step ST42). At that time, the object determining unit 16 sets the direction along the travel direction of the host vehicle 1 at a low speed, that is, a direction in the arrow A1 as the reference direction. Alternatively, the object determining unit 16 calculates an approximate straight line ASL1 of the reflection point group G1 and sets a direction along the approximate straight line ASL1 as the reference direction with respect to each inter-reflection point straight line SL1, and calculates an approximate straight line ASL2 of the reflection point group G2 and sets a direction along the approximate straight line ASL2 as the reference direction with respect to each inter-reflection point straight line SL2.

Figure 19B:
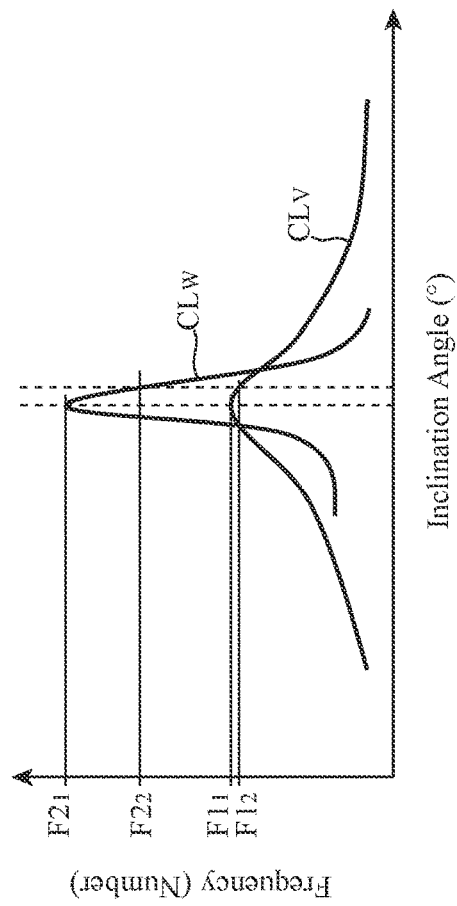
FIG. 19B is a characteristic diagram illustrating frequency distribution of inclination angles.

FIG. 19B illustrates a characteristic curve $CL_V$ indicating the frequency distribution of the inclination angle in the reflection point group G1 and a characteristic curve $CL_W$ indicating the frequency distribution of the inclination angles in the reflection point group G2. The object determining unit 16 obtains the frequency distribution of the inclination angles in the reflection point group G1 and calculates a relative ratio $R1(=F1_1/F1_2)$ between a largest frequency $F1_1$ and a second largest frequency $F1_2$ in the frequency distribution (step ST43). Also, the object determining unit 16 obtains the frequency distribution of the inclination angles in the reflection point group G2 and calculates a relative ratio $R2(=F2_1/F2_2)$ between a largest frequency $F2_1$ and a second largest frequency $F2_2$ in the frequency distribution (step ST43).

As illustrated in FIG. 19B, the distribution (characteristic curve $CL_V$) of the inclination angles in the reflection point group G1 is wider than the distribution of the inclination angles (characteristic curve $CL_W$) in the reflection point group G2. For this reason, the relative ratio R1 $(=F1_1/F1_2)$ calculated by the object determining unit 16 at step ST43 for the reflection point group G1 is a value smaller than the relative ratio R2 $(=F2_1/F2_2)$ calculated by the object determining unit 16 at step ST43 for the reflection point group G2 (R1<R2).

Subsequently, the object determining unit 16 compares the relative ratios R1 and R2 with a threshold θ (step ST44). Since the relative ratio R1 is a value smaller than the threshold θ (R1<θ), the object determining unit 16 determines that the object associated with the reflection point group G1 is the parked vehicles PV1 to PV3. On the other hand, the object determining unit 16 determines that the object associated with the reflection point group G2 is the wall W, since the relative ratio R2 is a value equal to or larger than the threshold θ (R2≥θ).

Note that, the object determining unit 16 may calculate a normal vector with respect to each inter-reflection point straight line at step ST41 and calculate the inclination angle of each normal vector with respect to the reference direction at step ST42. Distribution of the inclination angles of the normal vectors is similar to the distribution of the inclination angles of the inter-reflection point straight lines. Therefore, the object determining unit 16 may determine whether the object corresponding to each reflection point group is the parked vehicle or the wall by the processes at steps ST43 and ST44 similar to the above.

Also, the feature amount calculated by the object determining unit 16 at step ST43 may correspond to the distribution of the inclination angles in each reflection point group, and this is not limited to the relative ratio between the largest frequency and the second largest frequency in the frequency distribution. For example, the object determining unit 16 may calculate a difference value between the largest frequency and the second largest frequency in the frequency distribution as the feature amount.

Also, the parking assistance device 101 may adopt various variations similar to that described in Embodiment 1. For example, the parking assistance device 101 may include either the distance sensors 2FL and 2FR or the distance sensors 2RL and 2RR. Also, it is also possible that the parking assistance device 101 does not include a host vehicle position calculating unit 12 as in the example illustrated in FIG. 14.

As described above, the parking assistance device 101 according to Embodiment 2 is provided with the object determining unit 16 which determines whether the object associated with the reflection point group is the parked vehicle or the wall, and the parking space pitch calculating unit 14 calculates the parking space pitch using the periodicity of the shape of the reflection point group determined to be associated with the parked vehicle. Therefore, the reflection point group corresponding to the wall may be excluded from the calculation of the parking space pitch. As a result, it is possible to calculate the parking space pitch more accurately.

Embodiment 3

Figure 20:
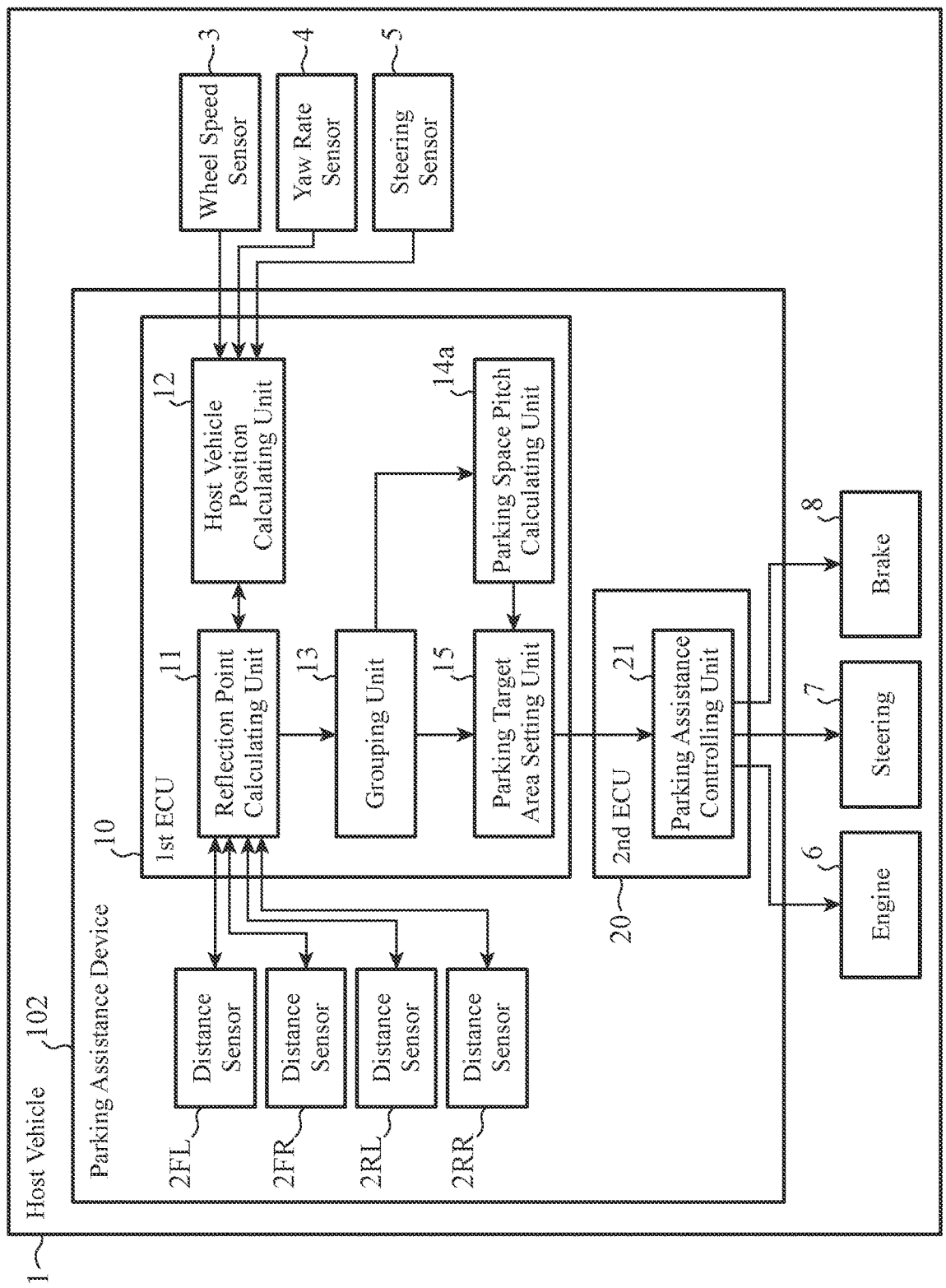
FIG. 20 is a functional block diagram illustrating a state in which a parking assistance device according to Embodiment 3 of the present disclosure is mounted on a host vehicle.

FIG. 20 is a functional block diagram illustrating a state in which a parking assistance device according to Embodiment 3 of the present disclosure is mounted on a host vehicle. With reference to FIG. 20, a parking assistance device 102 according to Embodiment 3 is described.

Note that, in FIG. 20, the same reference sign is assigned to a block similar to that in the functional block diagram of Embodiment 1 illustrated in FIG. 1, and the description thereof is omitted. Also, since arrangement of distance sensors 2FL, 2FR, 2RL, and 2RR in a host vehicle 1 is similar to that described in Embodiment 1 with reference to FIG. 2, illustration and description thereof are omitted. Since a hardware configuration of a first ECU 10 is similar to that described with reference to FIG. 3 in Embodiment 1, illustration and description thereof are omitted. Since a hardware configuration of a second ECU 20 is similar to that described with reference to FIG. 4 in Embodiment 1, illustration and description thereof are omitted.

A parking space pitch calculating unit 14*a* calculates a parking space pitch using periodicity of a shape of a reflection point group. Herein, the parking space pitch calculating unit 14*a* calculates the parking space pitch by a method different from that of the parking space pitch calculating unit 14 according to the first and Embodiment 2s. A process by the parking space pitch calculating unit 14*a* is to be described later in detail with reference to a flowchart in FIG. 22.

The distance sensors 2FL, 2FR, 2RL, and 2RR, a reflection point calculating unit 11, a host vehicle position calculating unit 12, a grouping unit 13, the parking space pitch calculating unit 14*a*, a parking target area setting unit 15, and a parking assistance controlling unit 21 form a substantial part of the parking assistance device 102.

Figure 21:
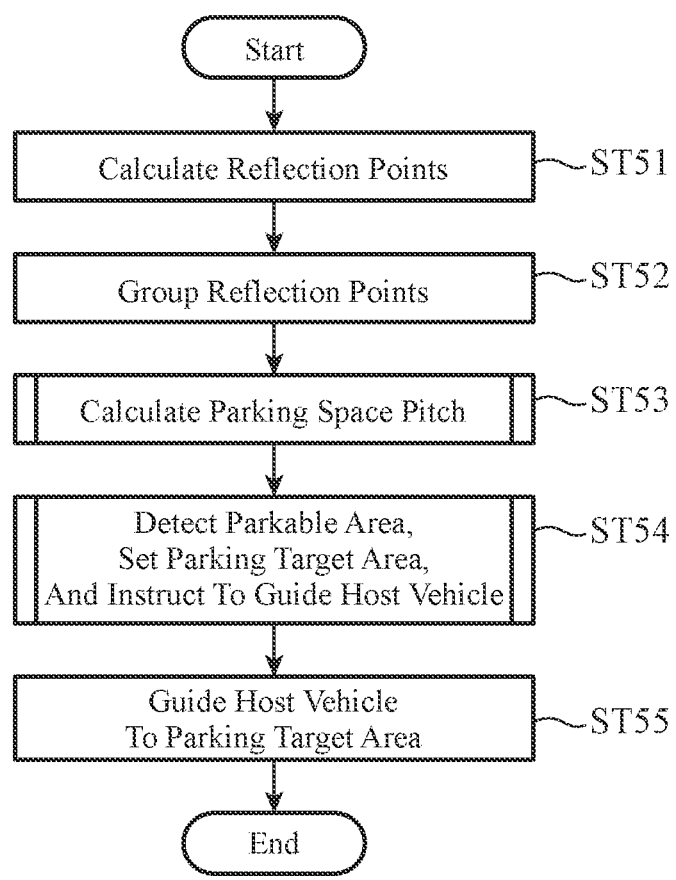
FIG. 21 is a flowchart illustrating operation of the parking assistance device according to Embodiment 3 of the present disclosure.

Next, operation of the parking assistance device 102 is described with reference to a flowchart in FIG. 21.

First, the reflection point calculating unit 11 calculates a reflection point (step ST51), and then the grouping unit 13 groups the reflection points (step ST52). Content of processes at steps ST51 and ST52 is similar to that at steps ST1 and ST2 illustrated in FIG. 5, so that the description thereof is omitted.

Next, at step ST53, the parking space pitch calculating unit 14*a* calculates the parking space pitch using the periodicity of the shape of the reflection point group set at step ST52. The process at step ST53 is described later in detail with reference to a flowchart in FIG. 22.

Next, the parking target area setting unit 15 detects a parkable area, sets a parking target area, and instructs the parking assistance controlling unit 21 to guide the host vehicle 1 (step ST54). Content of a process at step ST54 is similar to that at step ST4 illustrated in FIG. 5, that is, steps ST21 to ST27 illustrated in FIG. 7, so that the description thereof is omitted.

Next, the parking assistance controlling unit 21 guides the host vehicle 1 (step ST55). Content of a process at step ST55 is similar to that at step ST5 illustrated in FIG. 5, so that the description thereof is omitted.

Figure 22:
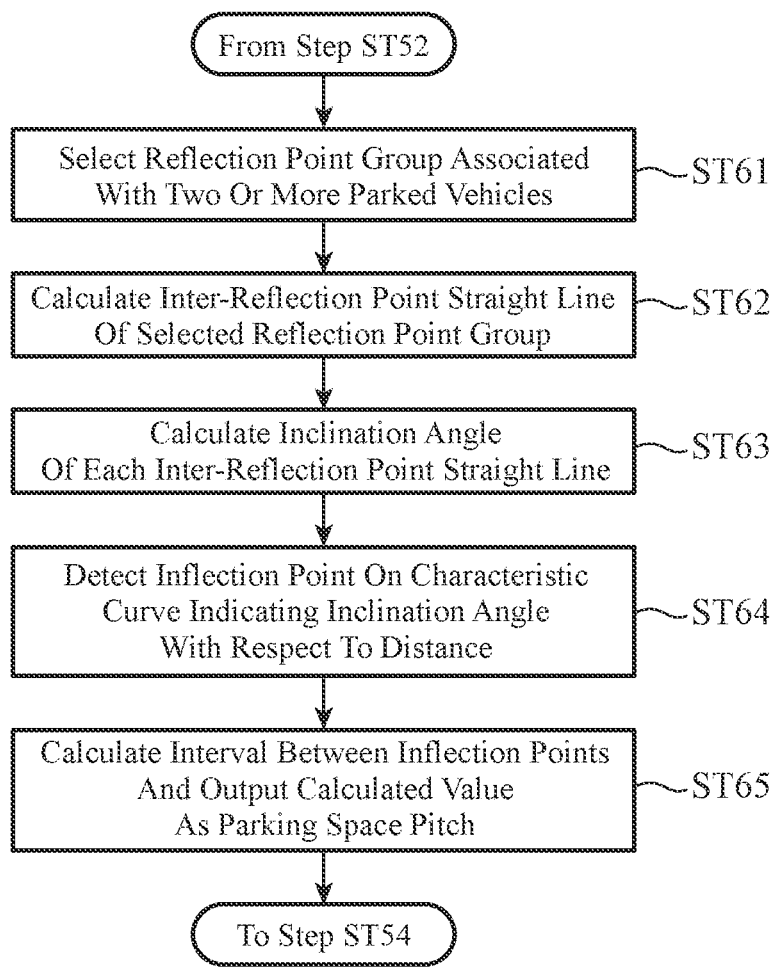
FIG. 22 is a flowchart illustrating detailed operation of a parking space pitch calculating unit according to Embodiment 3 of the present disclosure.

Next, with reference to the flowchart in FIG. 22, the process at step ST53 by the parking space pitch calculating unit 14*a* is described in detail.

First, at step ST61, the parking space pitch calculating unit 14*a* selects at least one reflection point group associated with two or more parked vehicles out of the reflection point groups set by the grouping unit 13 at step ST52. Content of a process at step ST61 is similar to that at step ST11 illustrated in FIG. 6, so that the description thereof is omitted.

Next, at step ST62, the parking space pitch calculating unit 14*a* calculates a straight line connecting adjacent reflection points in the reflection point group selected at step ST61, that is, an inter-reflection point straight line. Generally, since a plurality of reflection points is included in the reflection point group associated with two or more parked vehicles, the parking space pitch calculating unit 14*a* calculates a plurality of inter-reflection point straight lines.

Next, at step ST63, the parking space pitch calculating unit 14*a* calculates an inclination angle of each inter-reflection point straight line with respect to a reference direction. At that time, the parking space pitch calculating unit 14*a* sets a direction along a travel direction of the host vehicle 1 at a low speed as the reference direction. Alternatively, the parking space pitch calculating unit 14a calculates an approximate straight line of the reflection point group selected at step ST61 and sets a direction along the calculated approximate straight line as the reference direction.

Herein, a characteristic curve (hereinafter, referred to as a "second characteristic curve") obtained by plotting a distance between a reference point (for example, a reflection point arranged on one end of the reflection point group out of a plurality of reflection points included in the reflection point group selected at step ST61) and each inter-reflection point straight line (hereinafter, simply referred to as "distance") along the abscissa and plotting the inclination angle of each reflection point group along the ordinate has a shape having periodicity and a plurality of inflection points. At that time, the inflection point corresponding to either a local minimum or a local maximum on the second characteristic curve appears in a position corresponding to the central portion of the parked vehicle, and the inflection point corresponding to the other appears in a position corresponding to the central portion of an interval between adjacent parked vehicles. Therefore, an interval between the inflection points corresponding to the local minimum is a value corresponding to the parking space pitch, and an interval between the inflection points corresponding to the local maximum is also a value corresponding to the parking space pitch.

Accordingly, the parking space pitch calculating unit 14a detects the inflection point on the second characteristic curve (step ST64). The parking space pitch calculating unit 14a calculates the interval between the inflection points corresponding to the local minimum on the second characteristic curve or the interval between the inflection points corresponding to the local maximum on the second characteristic curve and outputs the calculated value as the parking space pitch (step ST65).

Figure 23:
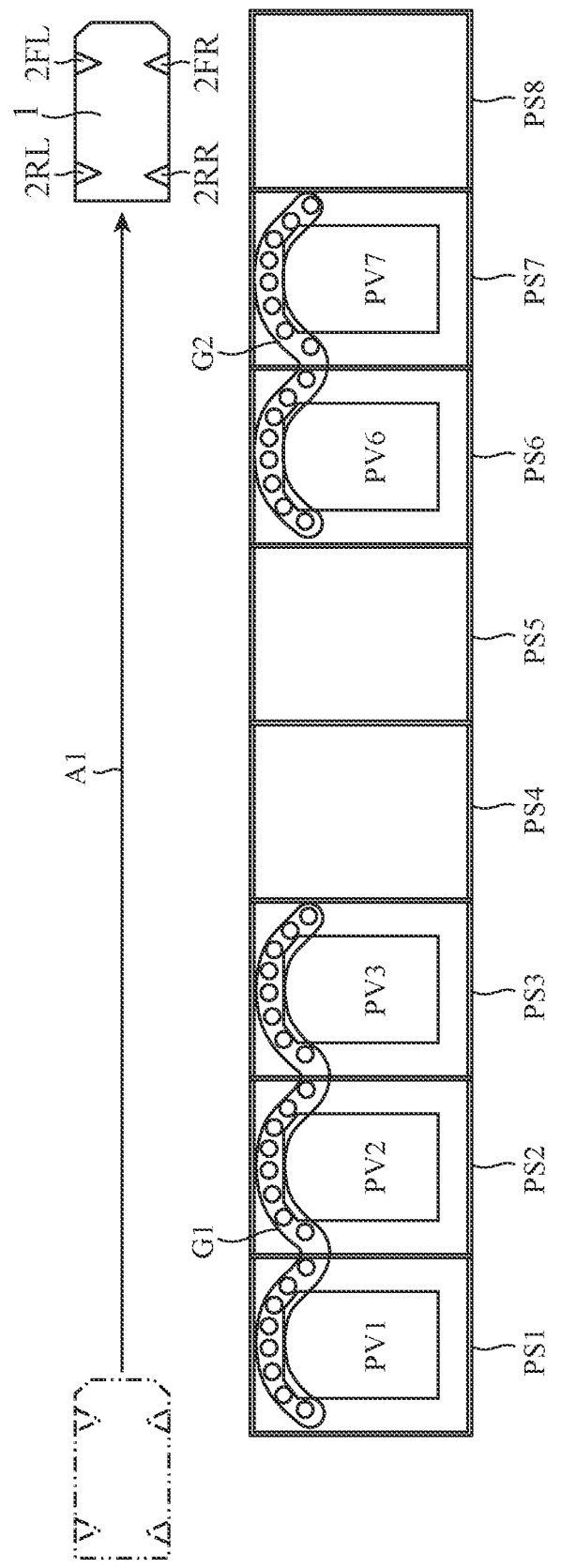
FIG. 23 is an explanatory view illustrating a reflection point calculated by a reflection point calculating unit and a reflection point group set by a grouping unit, according to Embodiment 3 of the present disclosure.

Next, with reference to FIGS. 23 and 24, a specific example of a process by the reflection point calculating unit 11, the grouping unit 13, and the parking space pitch calculating unit 14a is described.

As illustrated in FIG. 23, eight parking spaces PS1 to PS8 are arranged side by side in a parking lot for perpendicular parking. The host vehicle 1 travels at a low speed in an arrangement direction of the parking spaces PS1 to PS8. In the drawing, an arrow A1 indicates a travel trajectory of the host vehicle 1 at a low speed. The ultrasonic waves transmitted by the distance sensors 2FR and 2RR during the travel are reflected by parked vehicles PV1 to PV3, PV6, and PV7. As a result, the reflection point calculating unit 11 calculates a plurality of reflection points indicated by white circles (○) in the drawing (step ST51). The grouping unit 13 sets two reflection point groups G1 and G2 by grouping these reflection points (step ST52).

Figure 24A:
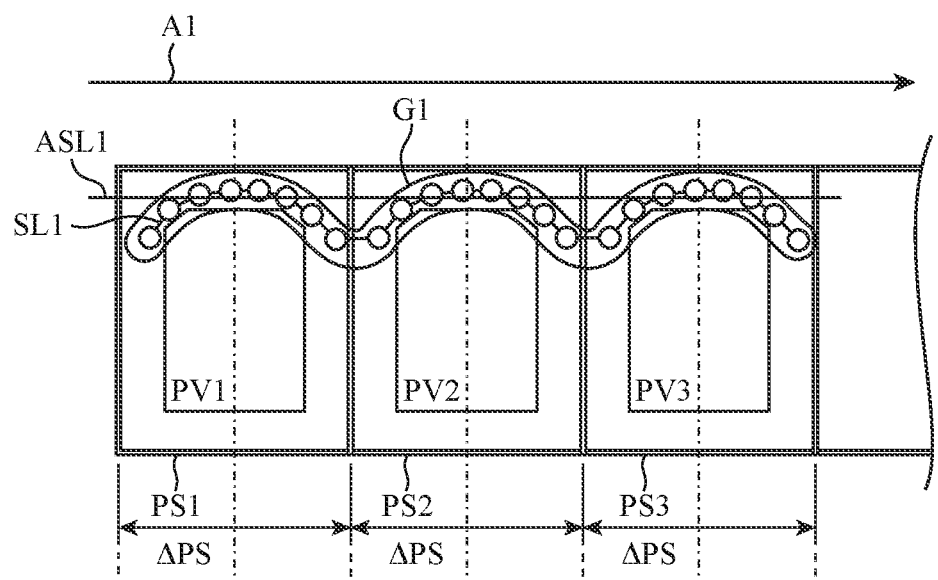
FIG. 24A is an explanatory view illustrating an inter-reflection point straight line and the like calculated by the parking space pitch calculating unit according to Embodiment 3 of the present disclosure.

Next, the parking space pitch calculating unit 14a selects one reflection point group G1 associated with the three parked vehicles PV1 to PV3 (step ST61). Next, as illustrated in FIG. 24A, the parking space pitch calculating unit 14a calculates an inter-reflection point straight line SL1 of the selected reflection point group G1 (step ST62). In an example illustrated in FIG. 24, since 24 reflection points are included in the reflection point group G1, the object determining unit 16 calculates 23 inter-reflection point straight lines SL1.

Figure 24B:
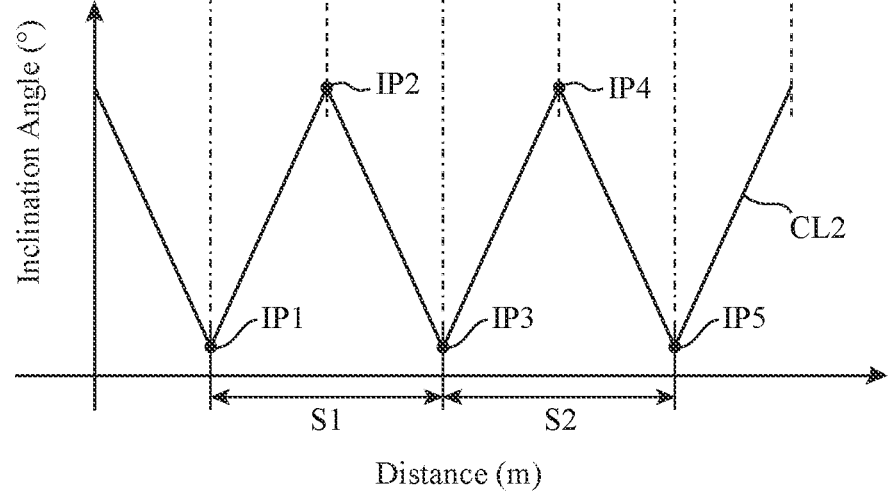
FIG. 24B is a characteristic diagram illustrating an inclination angle with respect to a distance.

As illustrated in FIG. 24B, the characteristic curve indicating the inclination angle with respect to the distance, that is, the second characteristic curve CL2 has a shape having periodicity and has a plurality of inflection points IP1 to IP5. At that time, the inflection point IP1 corresponding to the local minimum appears in a position corresponding to the central portion of the parked vehicle PV1, the inflection point IP3 corresponding to the local minimum appears in the position corresponding to the central portion of the parked vehicle PV2, and the inflection point IP5 corresponding to the local minimum appears in a position corresponding to the central portion of the parked vehicle PV3. Therefore, an interval S1 between the inflection points IP1 and IP3 and an interval S2 between the inflection points IP3 and IP5 are values corresponding to a parking space pitch ΔPS.

Therefore, the parking space pitch calculating unit 14a detects the inflection point IP1 to IP5 on the second characteristic curve CL2 (step ST64). The parking space pitch calculating unit 14a calculates the interval S1 between the inflection points IP1 and IP3 corresponding to the local minimum or the interval S2 between the inflection points IP3 and IP5 corresponding to the local minimum, and outputs the calculated value as the parking space pitch ΔPS (step ST65).

Note that, the parking space pitch calculating unit 14a may calculate a plurality of intervals S1 and S2 and output an average value of the intervals S1 and S2 as the parking space pitch ΔPS. In the example illustrated in FIG. 24, since the parked vehicles PV1 to PV3 are arranged in the central portion of the corresponding parking space PS1 to PS3, respectively, the intervals S1 and S2 are substantially equal to each other. However, when each of the parked vehicles PV1 to PV3 is located on the left or right within the corresponding parking spaces PS1 to PS3, the intervals S1 and S2 are different from each other. By calculating the average value of the intervals S1 and S2, it is possible to reduce an effect of variation in arrangement of the parked vehicles PV1 to PV3 in the parking spaces PS1 to PS3, respectively, on calculation of the parking space pitch ΔPS.

As described above, the inflection point IP2 corresponding to the local maximum appears in the position corresponding to the central portion of the interval between the parked vehicles PV1, PV2, and the inflection point IP4 corresponding to the local maximum appears in the position corresponding to the central portion of the interval between the parked vehicles PV2 and PV3 adjacent to each other. Therefore, the interval between the inflection points IP2 and IP4 is a value corresponding to the parking space pitch ΔPS. Therefore, at step ST65, the parking space pitch calculating unit 14a may calculate the interval between the inflection points IP2 and IP4 corresponding to the local maximum and output the calculated value as the parking space pitch ΔPS.

Also, the parking space pitch calculating unit 14a may calculate a normal vector with respect to each inter-reflection point straight line at step ST62 and calculate an inclination angle of each normal vector with respect to the reference direction at step ST63. The characteristic curve indicating the inclination angle of the normal vector with respect to the distance is obtained by inverting the local maximum and the local minimum of the characteristic curve (second characteristic curve CL2) indicating the inclination angle of the inter-reflection point straight line with respect to the distance. Therefore, the parking space pitch calculating unit 14a may calculate the parking space pitch ΔPS by processes at steps ST64 and ST65 similar to the above.

Note that, the parking assistance device 102 may adopt various variations similar to that described in Embodiment 1. For example, the parking assistance device 102 may include either the distance sensors 2FL and 2FR or the distance sensors 2RL and 2RR. Also, it is also possible that the parking assistance device 102 does not include the host vehicle position calculating unit 12 as in the example illustrated in FIG. 14.

Also, the parking assistance device 102 may include the object determining unit 16 similar to that of the parking assistance device 101 according to Embodiment 2. In this case, the parking space pitch calculating unit 14a calculates the parking space pitch by using the periodicity of the shape of the reflection point group determined to be associated with the parked vehicle by the object determining unit 16 out of the reflection point groups set by the grouping unit 13. That is, at step ST61, the parking space pitch calculating unit 14a selects at least one reflection point group associated with two or more parked vehicles out of the reflection point groups determined to be associated with the parked vehicle by the object determining unit 16.

Also, when the object determining unit 16 is provided on the parking assistance device 102, it is also possible that the parking space pitch calculating unit 14a does not execute the process of calculating the inclination angle (steps ST62 and ST63) but executes the processes at steps ST64 and ST65 by using the inclination angle calculated by the object determining unit 16.

As described above, in the parking assistance device 102 according to Embodiment 3, the parking space pitch calculating unit 14a calculates the inclination angle of the straight line (inter-reflection point straight line) connecting the adjacent reflection points in the reflection point group, and calculates the parking space pitch on the basis of the interval between the inflection points on the characteristic curve (second characteristic curve) indicating the inclination angle with respect to the distance. As a result, the parking space pitch ΔPS may be calculated as illustrated in FIG. 24.

Note that, within the scope of the present invention, embodiments may be freely combined, modifications to any components of the embodiments may be made, or omissions of any components of the embodiments may be made.

INDUSTRIAL APPLICABILITY

One or more parking assistance devices of the present disclosure may be used in assisting with perpendicular parking.

REFERENCE SIGNS LIST

1: Host vehicle, 2FL, 2FR, 2RL, 2RR: Distance sensor, 3: Wheel speed sensor, 4: Yaw rate sensor, 5: Steering sensor, 6: Engine, 7: Steering, 8: Brake, 10: Electronic control unit (1st ECU), 11: Reflection point calculating unit, 12: Host vehicle position calculating unit, 13: Grouping unit, 14, 14a: Parking space pitch calculating unit, 15: Parking target area setting unit, 16: Object determining unit, 20: Electronic control unit (2nd ECU), 21: Parking assistance controlling unit, 31: Processor, 32: Memory, 33: Processing circuit, 41: Processor, 42: Memory, 43: Processing circuit, 100, 101, 102: Parking assistance device

The invention claimed is:

1. A parking assistance device comprising:
a distance sensor for transmitting a detection wave laterally with respect to a host vehicle and receiving a reflected wave of the detection wave during travelling of the host vehicle; and
processing circuitry to
calculate reflection points indicating a position at which the detection wave is reflected;
group the reflection points;
calculate a parking space pitch indicating a width of a parking space by using periodicity of a shape included in a reflection point group set in the grouping;
set a parking target area which is a target of perpendicular parking by the host vehicle; and
guide the host vehicle to the parking target area on a basis of the parking space pitch, wherein
the processing circuitry is configured to calculate an autocorrelation function on a curve connecting the reflection points included in the reflection point group, and calculate the parking space pitch on a basis of an interval between peak points on a characteristic curve indicating the autocorrelation function.

2. The parking assistance device according to claim 1, wherein the processing circuitry is configured to guide the host vehicle to a central portion of the parking target area if one parking space is included in the parking target area, or guide the host vehicle to a central portion of any parking space if a plurality of parking spaces is included in the parking target area.

3. The parking assistance device according to claim 1, wherein the processing circuitry is configured to sort the reflection points into a same reflection point group if a distance between adjacent reflection points is smaller than a threshold.

4. The parking assistance device according to claim 1, wherein the processing circuitry is configured to correct the reflection point group depending on a moving state of the host vehicle, and calculate the parking space pitch by using periodicity of the shape included in the corrected reflection point group.

5. The parking assistance device according to claim 1, wherein a pair of right and left distance sensors are provided in a front half portion of the host vehicle or a pair of right and left distance sensors are provided in a rear half portion of the host vehicle.

6. A parking assistance device comprising:
a distance sensor for transmitting a detection wave laterally with respect to a host vehicle and receiving a reflected wave of the detection wave during travelling of the host vehicle, and
processing circuitry to
calculate reflection points indicating a position at which the detection wave is reflected;
group the reflection points;
calculate a parking space pitch indicating a width of a parking space by using periodicity of a shape included in a reflection point group set in the grouping,
set a parking target area which is a target of perpendicular parking by the host vehicle; and
guide the host vehicle to the parking target area on a basis of the parking space pitch,
wherein the processing circuitry is configured to calculate the reflection point using a two-circle intersection process, and exclude a reflection point indicating a position outside a detectable range by the distance sensor from objects in the grouping.

7. The parking assistance device according to claim 6, wherein the processing circuitry is configured to calculate an inclination angle of a straight line connecting the reflection points adjacent to each other in the reflection point group, and calculate the parking space pitch on a basis of an interval between inflection points on a characteristic curve indicating inclination angle with respect to distance.

8. The parking assistance device according to claim 6, wherein the processing circuitry is configured to determine whether an object related to the reflection point group is a parked vehicle or a wall, wherein
   the processing circuitry is configured to calculate the parking space pitch by using periodicity of the shape included in the reflection point group determined to be related to the parked vehicle.

* * * * *